United States Patent
Rasmussen et al.

(10) Patent No.: US 6,266,719 B1
(45) Date of Patent: Jul. 24, 2001

(54) HIGH-THROUGHPUT INTERFACE BETWEEN A SYSTEM MEMORY CONTROLLER AND A PERIPHERAL DEVICE

(75) Inventors: Norman J. Rasmussen, Hillsboro, OR (US); William S. Wu, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/656,192

(22) Filed: Sep. 6, 2000

Related U.S. Application Data

(62) Division of application No. 09/382,885, filed on Aug. 25, 1999, now Pat. No. 6,167,468, which is a division of application No. 09/002,130, filed on Dec. 31, 1997, now Pat. No. 6,006,291.

(51) Int. Cl.[7] .............. G06F 13/28; G06F 13/38
(52) U.S. Cl. ................ 710/60; 710/57; 710/53; 712/38
(58) Field of Search .................. 712/38, 37, 61, 712/33, 39; 710/57, 56, 60, 52.2, 10.21, 107, 52, 128, 53, 20.4, 7.57; 711/168, 131, 149, 150, 171

(56) References Cited

U.S. PATENT DOCUMENTS

| | | | |
|---|---|---|---|
| 5,317,694 | 5/1994 | Shah | 395/275 |
| 5,712,991 | 1/1998 | Wickman et al. | 395/250 |
| 5,745,732 * | 4/1998 | Cherukuri et al. | 711/168 |
| 5,781,927 | 7/1998 | Wu et al. | 711/151 |
| 5,911,051 * | 6/1999 | Carson et al. | 710/107 |

* cited by examiner

Primary Examiner—Daniel H. Pan
(74) Attorney, Agent, or Firm—Trop, Pruner & Hu, P.C.

(57) ABSTRACT

A high-throughput memory access interface allows higher data transfer rates between a system memory controller and video/graphics adapters than is possible using standard local bus architectures. The interface enables data to be written directly to a peripheral device at either one of two selectable speeds. The peripheral device may be a graphics adapter. A signal indicative of whether the adapter's write buffers are full is used to determine whether a write transaction to the adapter can proceed. If the transaction can not proceed at that time, it can be enqueued in the interface.

5 Claims, 38 Drawing Sheets

HIGH-THROUGHPUT INTERFACE BETWEEN A SYSTEM MEMORY CONTROLLER AND A PERIPHERAL DEVICE

This is a divisional of prior application Ser. No. 09/382,885 filed Aug. 25, 1999, now U.S. Pat. No. 6,167,468 which is a divisional of prior application Ser. No. 09/002,130 filed Dec. 31, 1997, now U.S. Pat. No. 6,006,291.

The present invention relates to computer bus architectures. More particularly, the present invention relates to a high-throughput interface between system memory controller and a peripheral device in a computer system.

BACKGROUND OF THE INVENTION

Personal computer systems generally include one or more local buses that permit peripheral devices to be connected to the computer system's microprocessor. One such local bus is the PCI (Peripheral Component Interconnect) bus. A design concern associated with virtually any local bus architecture is the maximum rate of data transfer, or throughput, that can be achieved on the bus. The PCI bus provides substantial improvements over its predecessors in terms of data throughput. However, certain applications require even greater throughput than PCI can provide, particularly video and 3-D graphics applications.

Audio, video, and graphics applications are typically supported by peripheral devices known as "adapters" or "accelerators", that can be coupled to a local bus in a computer system. One way to reduce throughput requirements is to provide more local memory on the adapter. This solution reduces the amount of data that must be communicated over the bus and thus enhances the performance of the device. A disadvantage of this solution, however, is that many of these adapters use a type of memory that is expensive.

In contrast, the system memory in a computer system generally includes much more memory than these adapters can provide and tends to be easier to upgrade. The Accelerated Graphics Port ("AGP") enables audio, video, or graphics adapters to more effectively make use of system memory and thereby reduce the amount of local memory that is required. In particular, AGP provides a high-throughput, component-level interconnect through which peripheral devices, such as audio, video, or graphics adapters, can access system memory.

While AGP has effectively increased the memory space available to adapters by allowing them to access system memory, there is a continuing need to enable AGP compliant masters to access information as quickly as possible.

SUMMARY OF THE INVENTION

In at least some embodiments, speed and efficiency may be improved by allowing an interface, such as AGP, to selectively write data directly to a peripheral device, such as a graphics accelerator at more than one data transfer rate. For example, write transactions to the graphics accelerator could proceed at higher rates associated with the interface or a lower rate associated with a bus connected to the interface.

In accordance with one aspect of the present invention, an interface between a system memory controller and a peripheral device. The interface includes an element adapted to selectively write data directly to the peripheral device at one of at least two rates. A selection device selects the rate at which data is written directly to the peripheral device.

In accordance with another aspect of the present invention, a method of transferring data between an interface, a system memory controller and a peripheral device includes selecting between at least two data transfer rates to the peripheral device. The data is transferred from the interface to the peripheral device at the selected rate.

In accordance with still another aspect of the present invention, an interface between a system memory controller and a graphics accelerator includes a connection for enabling the interface to connect to a system memory controller, a processor and a graphics accelerator. A device, communicating with the connection, is arranged to enable the interface to write directly to the graphics accelerator at a selected one of at least two data transfer rates.

In accordance with yet another aspect of the present invention, a method for transferring data between an interface, a system memory controller and a graphics accelerator includes determining whether the graphics accelerator can accept a given write transaction. Data is written from the interface directly to the graphics accelerator if the graphics accelerator can accept the transaction.

In accordance with but another aspect of the present invention, a computer system includes a processor, a system memory controller and a peripheral device. The interface has ports for connecting to the system memory controller, the processor, and the peripheral device. The system is adapted to selectively write data directly to the peripheral device at one of at least two data transfer rates.

BRIEF DESCRIPTION OF THE DRAWINGS

FIGS. 4-1 through 4-35 illustrate the timing of various fast write transactions.

DETAILED DESCRIPTION

A high performance, component-level interconnect targeted at three-dimensional (3D) graphical display applications, referred to as Accelerated Graphics Port (AGP), is operable with the Peripheral Component Interconnect (PCI) bus. The AGP is described in detail in the Accelerated Graphics Port Interface Specification, Revision 1.0, published on Jul. 31, 1996, by Intel Corporation of Santa Clara, Calif. (hereinafter the "AGP Specification") hereby expressly incorporated by reference herein.

The AGP interface uses the 66 MHz PCI (Revision 2.1) specification (hereinafter the "PCI Specification") as an operational baseline. The PCI Specification is available from The PCI Special Interest Group, Portland, Oreg. 97214 and is hereby incorporated by reference herein. The AGP may differ from the PCI specification inter alia in that it may include deeply pipelined memory read and write operations to hide memory access latency, demultiplexing of address and data on the bus, and AC timing for 133 MHz data transfer rates.

Figure 1:
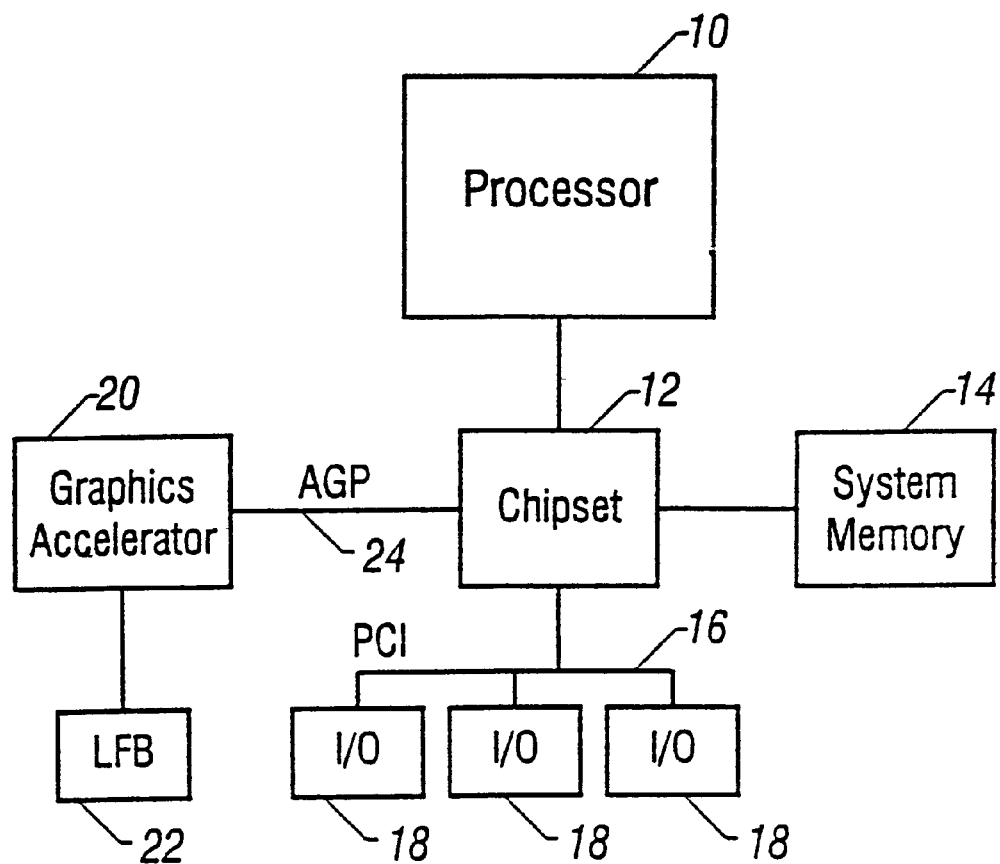
FIG. 1 illustrates a computer system with an Accelerated Graphics Port (AGP)

A exemplary computer system using AGP, shown in FIG. 1, includes a microprocessor (i.e., central processing unit, or "CPU") 10, which is coupled to chipset 12 containing a system memory controller, or "core logic". Those skilled in the art will appreciate that AGP may be implemented on many other computer architectures, in addition to that shown in FIG. 1.

The chipset 12 provides an interface between the microprocessor 10 and system memory 14, and between the microprocessor 10 and a PCI bus 16. Coupled to the PCI bus 16 are a number of input/output (I/O) devices 18. The computer system also includes a graphics accelerator 20 coupled to a local frame buffer (LFB) 22, which is the local memory associated with the accelerator 20. The AGP 24 provides an interface between the graphics accelerator 20 and the chipset 12 to allow the graphics accelerator 20 to efficiently access system memory 14.

Both AGP bus transactions and PCI bus transactions may be run over the AGP interface. An AGP compliant device may transfer data to system memory 14 using either AGP transactions or PCI transactions. The core logic can access the AGP compliant master (graphics) device 20 only with PCI transactions. Traffic on the AGP interface may consist of a mixture of interleaved AGP and PCI transactions.

AGP transactions may be run in a split transaction fashion where the request for data transfer is disconnected in time from the data transfer itself. An AGP compliant device 26 (bus master), shown in FIG. 2, initiates an AGP transaction with an "access request." The device 26 includes an AGP interface 44 between the AGP 24 and a data source/sink 21. The AGP interface 44 includes an AGP read data return queue 46, AGP read/write request queue 48, and AGP write data queue 50.

The core logic 28 (target) responds to the access request by directing the corresponding data transfer at a later time. The core logic 28 includes a memory controller 36, an AGP to memory bridge 38, and a PCI to memory bridge 40. The core logic 28 connects to the CPU 10, system memory 14, AGP 24 and the PCI bus 16.

The fact that the access requests are separated from the data transfers allows the AGP compliant device to issue several access requests in a pipelined fashion while waiting for the data transfers to occur. Pipelining access requests results in having several read and/or write requests outstanding in the core logic's AGP read and write request queue 30 at any point in time. The AGP compliant device 26 tracks the state of the AGP read and write request queue 30 in order to limit the number of outstanding requests and identify data transactions.

The core logic 28 processes the access requests present in its request queue 30. Read data will be obtained from system memory and returned at the core chipset's initiative via the AGP's read data return queue 46. Write data will be provided by the AGP compliant device 26 at the direction of the core logic 28 when space is available in the core logic's AGP write data queue 34. The AGP to memory bridge 38 also includes an AGP read data return queue 42. Therefore, AGP transaction traffic will generally consist of interleaved access requests and data transfers.

AGP pipelined operation allows for a single AGP compliant target, which is the system memory controller, referred to in this description as "core logic". In addition to AGP compliant target functions, the core logic also implements a complete PCI sequencer, both master and target. The AGP is defined as a point-to-point connection; therefore there is also a single AGP compliant master, which, in addition to implementing the AGP compliant master functions, also provides full PCI compliant target functionality.

AGP transactions may differ from PCI transactions in several ways. The data transfer in AGP transactions (both reads and writes) may be "disconnected" from its associated access request. That is, a request and the corresponding data may be separated by other AGP operations, whereas a PCI data phase is connected to its associated address phase with no possibility of intervening operations. AGP transactions use a different set of bus commands (defined below) than do PCI transactions. Memory addresses used in AGP transactions may be aligned on eight-byte boundaries; eight bytes is the minimum access size, and all accesses are integer multiples of eight bytes in length. In contrast, memory accesses for PCI transactions have four-byte granularity, aligned on four-byte boundaries. AGP access requests may have an explicitly defined access length or size. In contrast, PCI transfer lengths are defined by the duration of FRAME#.

Flow control on AGP and PCI is different. On PCI, the master and target may delay the transfer of data on any data phase. Before each data phase can complete, both the master and target agree that data can be transferred by asserting their respective xRDY# signal. When either is not prepared to transfer data, the current data phase is held in waitstates. PCI also allows the target to indicate to the master that it is not capable of completing the request at this time (retry or disconnect). Only when both agents agree to transfer data does data actually transfer.

On AGP, flow control is over blocks of data and not individual data phases. Flow control may involve initial blocks and subsequent blocks. Some transactions only have initial blocks; such as when the entire transaction can be completed within four clocks. Transactions that require more than four clocks to complete are comprised of both an initial block and one or more subsequent blocks. A block is defined as four AGP clocks and is eight-byte aligned, but is not required to be cacheline aligned. Depending on the transfer mode, the amount of data that is actually transferred may change. However, in all cases the number of clocks between throttle points (TPs) is four in a preferred embodiment.

Table 1-1 lists the signal names in the first column, signal types in the second column and the signal descriptions in the third column. In the second column, the direction of a tri-state ("t/s") or sustained tri-state ("s/t/s") signal is from the viewpoint of the core logic and is represented in parentheses "( )". For example, PIPE# is a s/t/s that is always an input for the core logic. The tables below describe their operation and use, and are organized in four groups: Addressing, Flow Control, Status and Clocking.

Table 1-1 contains two mechanisms to enqueue requests by the AGP compliant master. The master chooses one mechanism at design time or during the initialization process and is not allowed to change during runtime. When PIPE# is used to enqueue addresses, the master is not allowed to enqueue addresses using the SBA port. When the SBA port is used PIPE# can not be used.

TABLE 1-1

AGP Addressing

| Name | Type | Description |
| --- | --- | --- |
| PIPE# | s/t/s (in) | Pipelined request is asserted by the current master to indicate a full width request is to be enqueued by the target. The master enqueues one request each rising edge of CLK while PIPE# is asserted. When PIPE# is de-asserted no new requests |

TABLE 1-1-continued

AGP Addressing

| Name | Type | Description |
|---|---|---|
| | | are enqueued across the AD bus. PIPE# is a sustained tri-state signal from a master (graphics controller) and is an input to the target (the core logic). |
| SBA [7: :0] | in | Sideband Address port provides an additional bus to pass address and command to the target from the master. SBA [7: :0] are outputs from a master and an input to the target. This port is ignored by the target until enabled. |

Table 1-2 contains the additional flow control used beyond the PCI flow control. If the master is always ready to accept return data, the AGP compliant master is not required to implement this signal, and the corresponding pin on the target is tied (internally pulled up) in the de-asserted state.

TABLE 1-2

AGP Flow Control

| Name | Type | Description |
|---|---|---|
| RBF | in | Read Buffer Full indicates if the master is ready to accept previously requested low priority read data or not. When RBF# is asserted the arbiter is not allowed to initiate the return of low priority read data to the master. |

Table 1-3 describes the status signals, their meaning and indicates how the AD bus may be used for subsequent transactions. The AD bus can be used to enqueue new requests, return previously requested read data, or request the master to provide previously enqueued write data. The ST[2::0] are qualified by the assertion of GNT#.

TABLE 1-3

AGP Status Signals

| Name | Type | Position |
|---|---|---|
| ST [2: :0] | out | Status bus provides information from the arbiter to a Master on what it may do. ST [2: :0] only have meaning to the master when its GNT# is asserted. When GNT# is de-asserted these signals have no meaning and must be ignored. |

The AGP clock list is set forth below in Table 1-4.

TABLE 1-4

AGP Clock list

| Name | Type | Description |
|---|---|---|
| $AD_{STB0}$ | s/t/s (in/out) | AD Bus Strobe 0 provides timing for 2x data transfer mode on the AD [15: :00]. The agent that is providing data drives this signal. |
| $AD_{STB1}$ | s/t/s (in/out) | AD Bus Strobe 1 provides timing for 2x data transfer mode on the AD [31: :16]. The agent that is providing data drives this signal. |
| $SB_{STB}$ | s/t/s (in) | SideBand Strobe provides timing for SBA [7: :0] and is always driven by the AGP compliant master (when supported). |
| CLK | t/s (in) | Clock provides timing for AGP and PCI control signals. |

PCI signals are redefined when used in AGP transactions. Some signals have slightly different semantics. FRAME#, IDSEL, STOP#, and DEVSEL# are not used by the AGP protocol. The revised role of certain PCI signals during AGP transactions is described in Table 2.

Table 2 PCI signals in relation to AGP

| | |
|---|---|
| IRDY# | IRDY# indicates the AGP compliant master is ready to provide all write data for the current transaction. Once IRDY# is asserted for a write operation, the master is not allowed to insert waitstates. The assertion of IRDY# for reads, indicates that the master is ready to transfer a subsequent block of read data. The master is never allowed to insert a waitstate during the initial block of a read transaction. However, it may insert waitstates after each block transfers. (There is no FRAME# - - IRDY# relationship for AGP transactions.) |
| TRDY# | TRDY# indicatesthe AGP compliant target is ready to provide read data for the entire transaction (when transaction can complete within four clocks) a block) or is ready to transfer a (initial or subsequent) block of data, when the transfer requires more than four clocks to complete. The target is allowed to insert waitstates after each block transfers on both read and write transactions. |
| REQ# | Same meaning as in PCI. (Used to request access to the bus to initiate a PCI or an AGP request.) |
| GNT# | Same meaning as in PCI but additional information is provided on ST [2: :0]. |
| C/BE [3: :0]# | Slightly different meaning than on PCI. Provides command information (different commands than PCI) by the master when requests are being enqueued using PIPE#. Provides valid byte information during AGP write transactions and is driven by the master. The target drives to "0000" during the return of AGP read data and is ignored by the AGP compliant master. |

As described above, there are two ways to enqueue requests: using the AD bus or the SBA port. If the master chooses the SBA port, it is not allowed to assert PIPE# for any transactions. If the master uses PIPE# to enqueue requests, it is not allowed to use the SBA port. The master requests permission from the core logic to use the AD bus to initiate an AGP request or a PCI transaction by asserting REQ#. The arbiter grants permission by asserting GNT# with ST[2::0] equal to "111" hereafter referred to as "START". When the master receives START it is required to start the bus operation within two clocks of when the bus becomes available.

The AGP 1× mode is the same as the PCI, four bytes per clock, 32-bit bus, 66 MHz operation. The AGP 2× mode is eight bytes per clock, 32-bit bus, 66 MHz operation where data is double pumped.

A Fast Write (FW) transaction proceeds from the core logic to an AGP master acting as a PCI target. This type of access is required to pass data/control directly to the AGP master instead of placing the data into system memory and then having the AGP master go read the data. For 1× transactions, the protocol simply follows the PCI Specification. However, for higher speed transactions (2× or higher), FW transactions follow a combination of PCI and AGP bus protocols for data movement. While a specific set of protocol requirements are illustrated in the following discussions, one skilled in the art may modify, eliminate or augment the protocols set forth herein.

The PCI Specification is followed for transaction initiation, while flow control follows the AGP block style rather than the PCI data phase style. Termination of the transaction is like PCI with some modifications to relationships between signals. For example, the PCI Specification requires IRDY# to be asserted when FRAME# is deasserted. However, for FW transactions, this relationship is not required.

One additional signal is needed when using the FW protocol—Write Buffer Full (WBF#). When WBF# is asserted, it indicates to the core logic that the PCI target's write buffers are full and that initiating an FW transaction to the target is not allowed. When WBF# is deasserted, the target is indicating to the core logic that it can accept at least five clocks worth of data before it will terminate the transaction.

The core logic uses PCI signals to perform FW transactions to the AGP master (acting as a PCI target). For FW transactions, the behavior of the PCI signals has been modified and does not follow the PCI Specification. For example, there is no relationship between FRAME# and IRDY# for FW transactions.

FRAME# is used to signal the start and duration of a transaction. On the first clock in which FRAME# is sampled asserted, the core logic has placed the address on the AD bus and the command on the C/BE# bus. Only PCI memory write commands (Memory Write, and Memory Write and Invalidate) are allowed for FW transactions. I/O and Configuration Write commands are not allowed. The first clock in which FRAME# is deasserted indicates the last clock in which data may be transferred. This means that FRAME# is allowed to be deasserted while IRDY# is deasserted.

IRDY# is used by the core logic to indicate to the target that a block of data is beginning to transfer. The core logic provides up to four clocks of data without inserting wait-states starting with the clock in which IRDY# is first asserted.

C/BE[3::0]# indicates which byte lanes carry meaningful data. Like PCI, any combination of byte enables (including no byte enable) is allowed. When the core logic initiates a FW transaction that transfers less data than an entire block (FW-2×8 bytes) it deasserts the byte enables for the lanes that do not have valid data. The target must qualify the data it latches with the byte enables to determine if valid data was latched.

TRDY# is used by the AGP master (acting as a PCI target) to indicate to the core logic if the master is willing to transfer a subsequent block of data. The target cannot terminate a FW transaction with retry as it can with PCI. The target uses WBF# to prevent the core logic from initiating a FW transaction when its write buffers are full. The target can request the master to stop the current transaction like PCI, but with slightly different meaning and protocol. A target of a FW transaction can terminate the request after the initial block transfers with disconnect (with and without) data, target-abort or with a modified version of master-abort.

DEVSEL#, used by the target to indicate that it owns the target control signals, must be asserted with (or before) the target can drive TRDY# or STOP#. There are some cases in which the target must suppress the assertion of DEVSEL# when a FW transaction is short to avoid contention of DEVSEL# for back to back transactions. When a transaction requires multiple blocks to complete, the target is required to have DEVSEL# asserted by the slow decode time, otherwise the core logic assumes that there is no target and completes the transaction with master-abort semantics. Master-abort termination on FW transactions can only occur after the initial block of data transfers. Therefore, the initial four clocks of data are lost if a FW master-abort is signaled.

STOP# is used by the target to request the core logic to stop the FW transaction after the current block completes (disconnect without data) or after the next block completes (disconnect with data). The target is allowed to terminate the transaction with target-abort when the target cannot complete the transaction as requested. The target is allowed to restrict how it is accessed using FW transactions (i.e., only Dword accesses, or contiguous byte enables).

Figure 3:
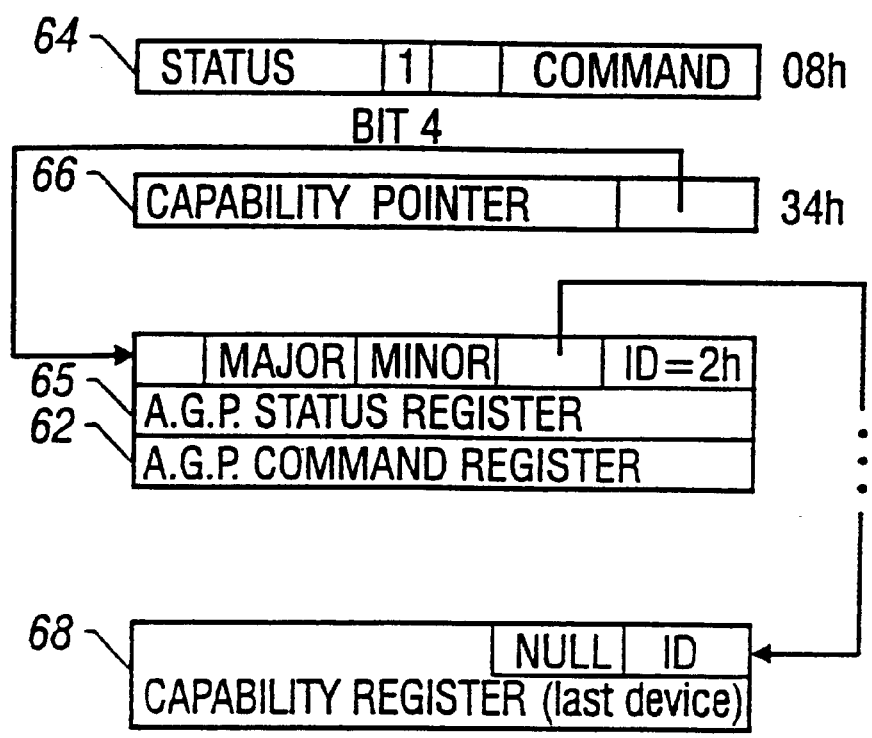
FIG. 3 illustrates the implementation of certain AGP capabilities.

A fast write bit in an AGP status register 65, shown in FIG. 3, indicates whether the device supports the FW mode. Similarly, the FW_Enable field of an AGP command register 62 includes a bit which determines whether memory write transactions from the core logic to the AGP master follow FW protocol. Configuration registers are used by the operating system to initialize the AGP features. The AGP master and target devices include a PCI status register 64, a capability pointer register 66 (which includes information about which AGP interface specification is implemented by the device), a capability identifier register 68 (which includes the capability ID e.g., 02 h for AGP) as well as AGP status and command registers.

Figure 2:
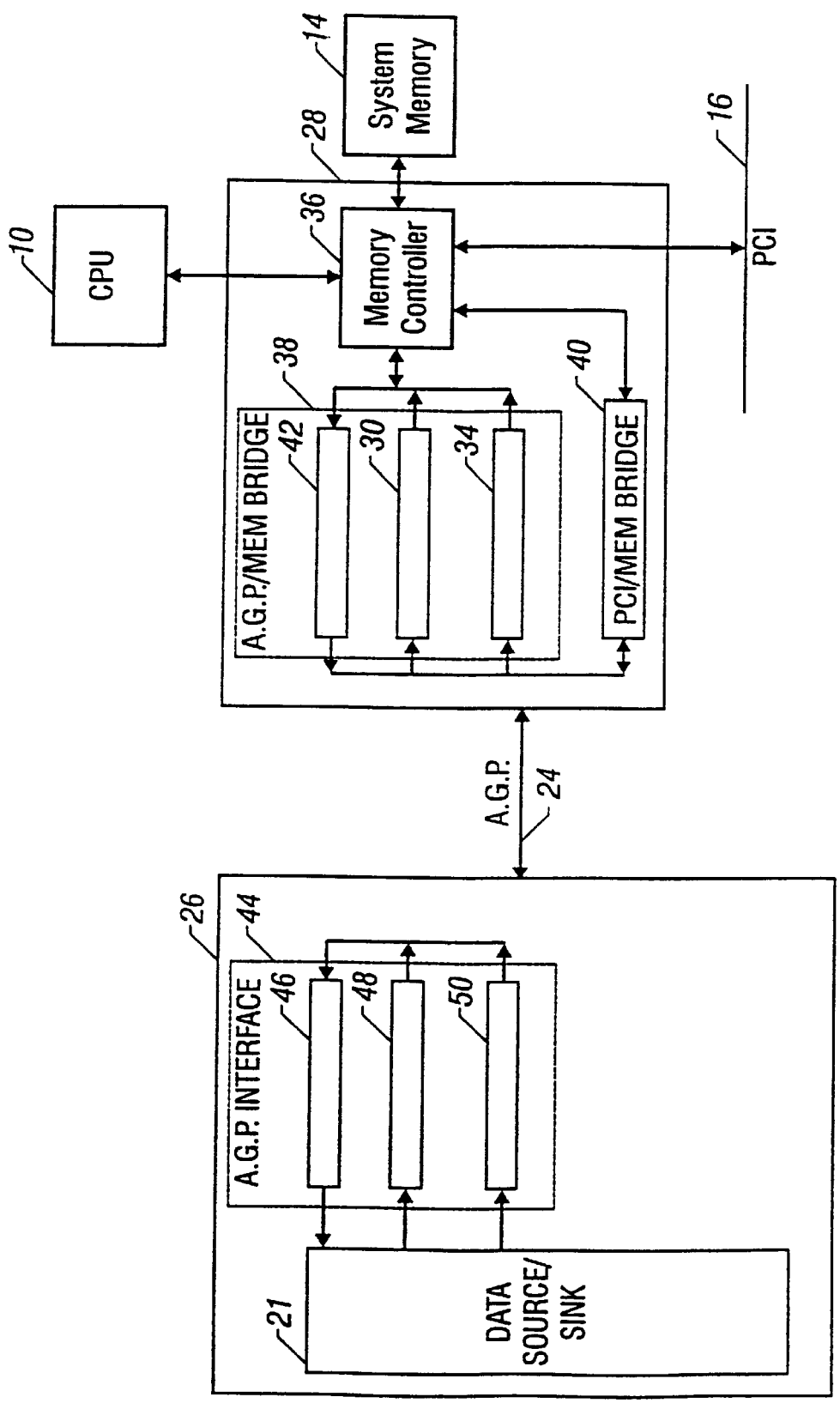
FIG. 2 illustrates an AGP access queuing model.

Referring to FIG. 2, the CPU 10 controls write routing based on the relevant address. If the FW bit is not set indicating FW is not enabled and the AGP interface is addressed, then the transaction is run according to normal, 1× mode, PCI protocol. If the FW bit is set, indicating FW is enabled, the transaction proceeds at an accelerated rate (2× or higher).

If the AGP master's write buffer is full, the transaction is enqueued, for example, in a buffer in the PCI/MEM bridge 40. The bridge 40 cannot initiate a transaction until WBF# is deasserted. Once WBF# is deasserted, the transaction can proceed with data being pushed from the bridge 40 through the AGP 24 at the accelerated rate (assuming the FW bit is set to enable the FW transfers). At least the first four clocks can transfer and thereafter there is negotiation to determine if additional data transfer is possible.

Figures 1, 4:
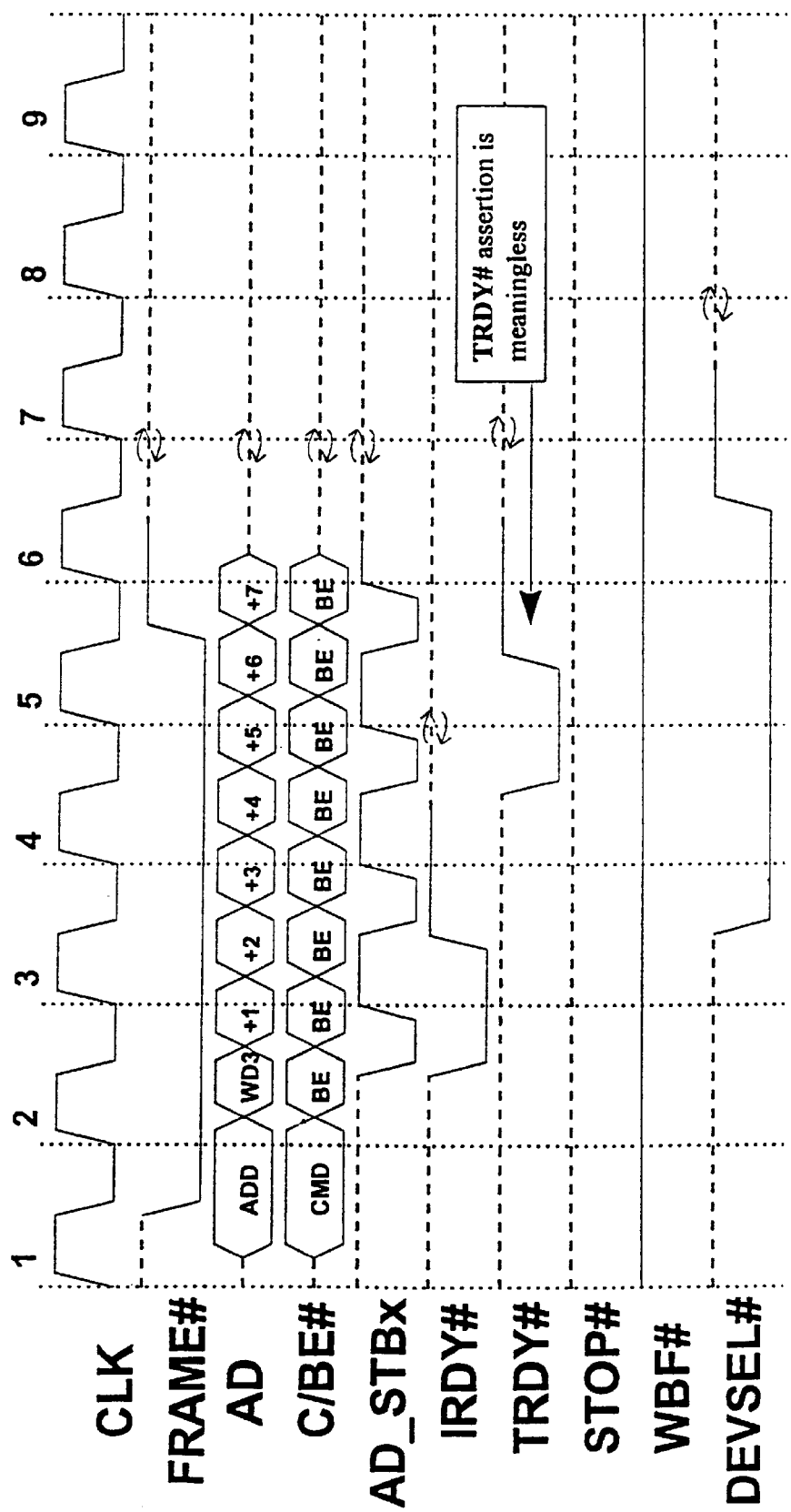
Figures 2, 4:
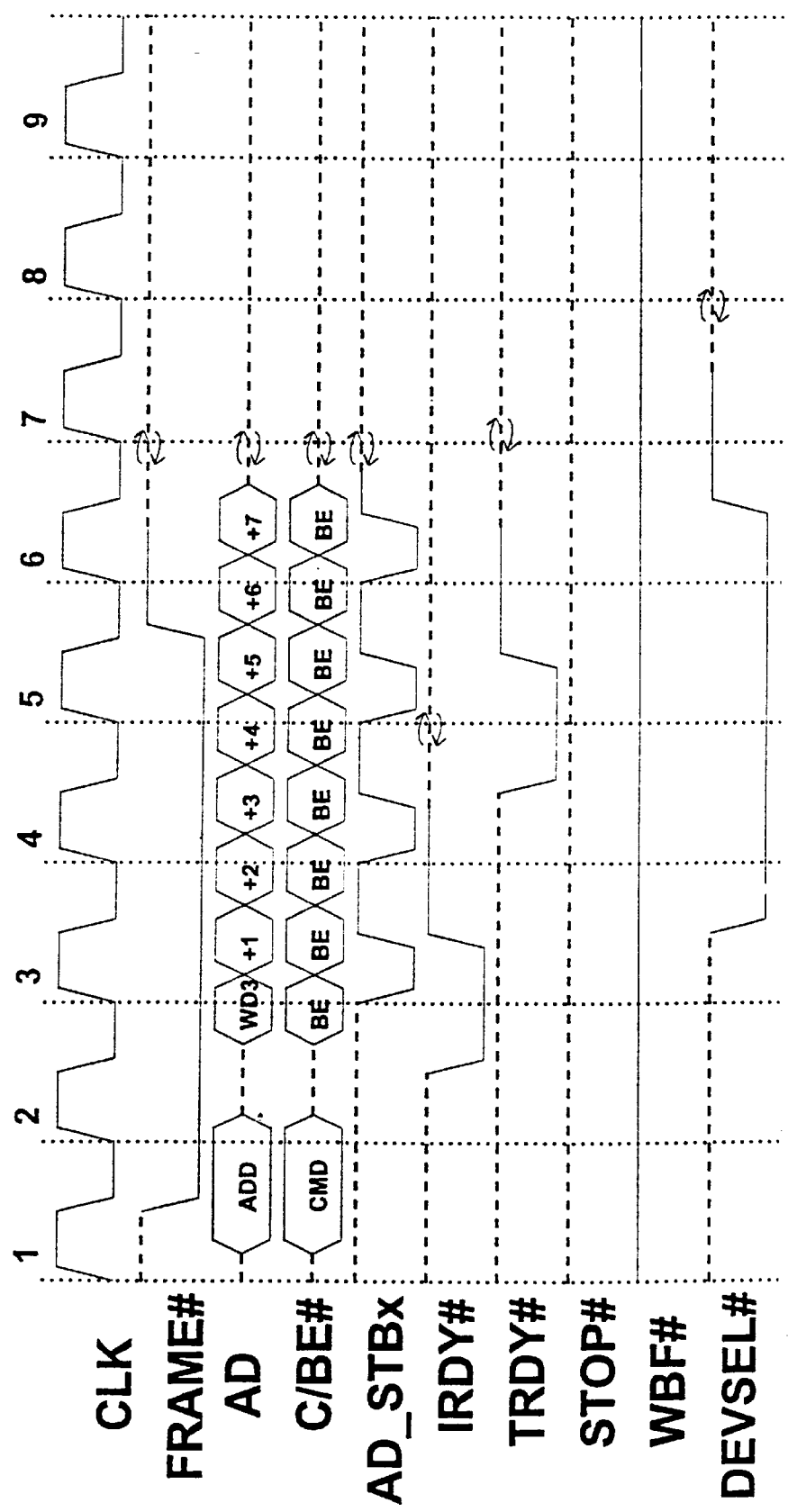
Figures 3, 4:
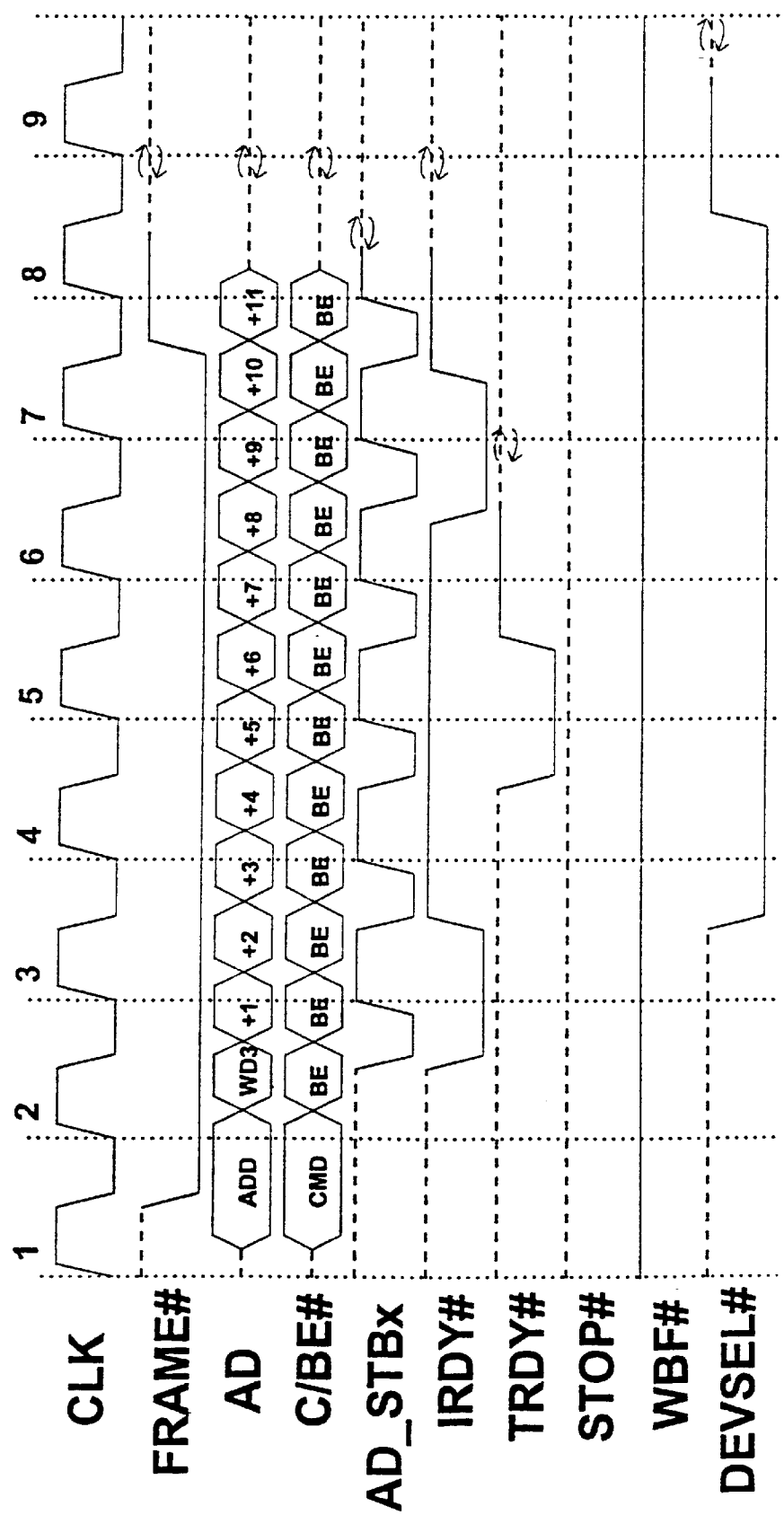
Figure 4:
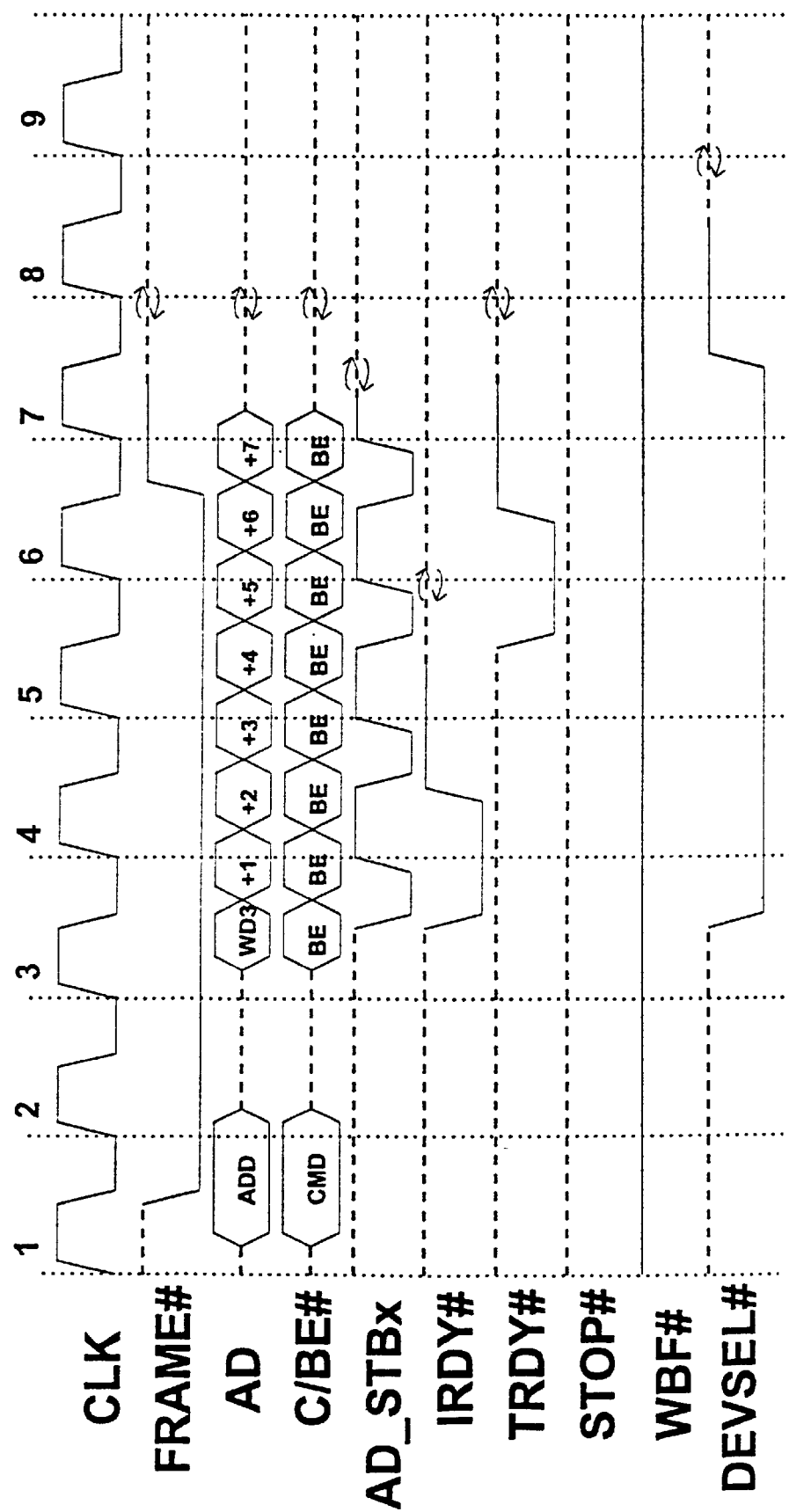

In an FW basic transaction, shown in FIG. 4-1, the core logic, when it has memory write data and has been enabled to do FW transactions, requests use of the AD bus by asserting its REQ#. This is not shown in the figure since the core logic's REQ# signal is an internal signal because the arbiter is part of the core logic.

When the core logic has been granted access to the bus (internal GNT# is asserted and the bus is Idle) and WBF# is deasserted, the core logic starts the transaction by placing the memory write command on C/BE[3::0]#, the address on AD[31::00], and asserting FRAME# which occurs on clock 2. On the next clock, the core logic places the actual data on the AD bus and asserts IRDY#. The first Dword of data actually transfers on the first falling edge of AD_STBx and the second Dword transfers on the rising edge. In FIG. 4-1, both occur during clock 2.

The target (AGP master) is required to accept the first block of data before it can insert waitstates or terminate the transaction because WBF# is deasserted on clock 1. The target accepts the first block of data and indicates to the master that it is willing to accept the next block by the asserting TRDY# (for a single clock) on clock 5. If the master wishes to continue the transaction, it keeps FRAME# asserted on clock 6 (which is illustrated in FIG. 4-3). Since the master deasserts FRAME# on clock 6 in FIG. 4-1, the assertion of TRDY# on clock 5 was meaningless. In this example, the target does not know that a second block of data is not required to complete the transaction until FRAME# is deasserted on clock 6. The target asserts TRDY# for clock 5 to allow the master to continue the burst (transfer a subsequent block) without waitstates.

FIG. 4-2 is the same as FIG. 4-1, except that the core logic takes the maximum delay for the assertion and deassertion of AD_STBx in FIG. 4-2 while FIG. 4-1 shows a minimum time. The rest of the transaction is the same with a single block of data being transferred. This figure illustrates that the actual data transfer can occur entirely in the second clock after the assertion of FRAME# or that (as in this figure) that part of the data transfer occurs in first clock after the assertion of FRAME# and the rest in the second clock.

Since the data only transfers on the edge of AD_STBx and not on the rising edge of CLK when IRDY# is asserted, care needs to be taken when latching data for FW transactions. The falling edge of the AD_STBx can occur on the rising edge of CLK. This condition occurs when the core logic takes the maximum time of 12 ns. to assert AD_STBx. The system can use an additional 3 ns. to propagate the signal to the target. Therefore, the target can receive AD_STBx 15 ns. after the rising edge of CLK, which is the period of CLK. The subsequent figures assume a more typical value than the maximum. Therefore, both edges of AD_STBx will occur in the same period of CLK; but this is not required and the target should be able to accept the maximum allowable delay.

FIG. 4-3 is the same as FIG. 4-1 except the core logic continues the transaction past the initial block of data. The assertion of TRDY# on clock 5 has meaning and indicates that the target is ready to transfer the second block of data. Since TRDY# is asserted on clock 5, the core logic is allowed to transfer data for the second block starting on clock 7. The target knows that the transaction is ending on clock 8 because FRAME# is deasserted. The next TP would have occurred on clock 9 if FRAME# had remained asserted. The state of IRDY# after it is asserted, indicating the start of a block transfer, is meaningless until two clocks after the completion of the next TP (TRDY# is asserted). In this example, IRDY# is meaningless on clocks 4, 5, and 6.

FW transactions are like AGP transactions and not like PCI transaction with respect to waitstates. The core logic is allowed to insert up to one waitstate between the address phase and the first clock of the data transfer, while the target cannot insert any waitstates during the initial block transfer. The target uses WBF# to prevent the core logic from initiating a FW transaction. Both agents are allowed to insert waitstates between subsequent data blocks.

FIG. 4-4 is an example where the core logic inserts a waitstate (maximum delay) to assert IRDY# indicating that the data is valid on the interface. The master starts the transaction as in FIG. 4-1, but in this case delays providing the data by one clock. IRDY# is not asserted until clock 4 while in FIG. 4-1 IRDY# is asserted on clock 3. Beyond this the two figures are the same.

Figures 4, 5:
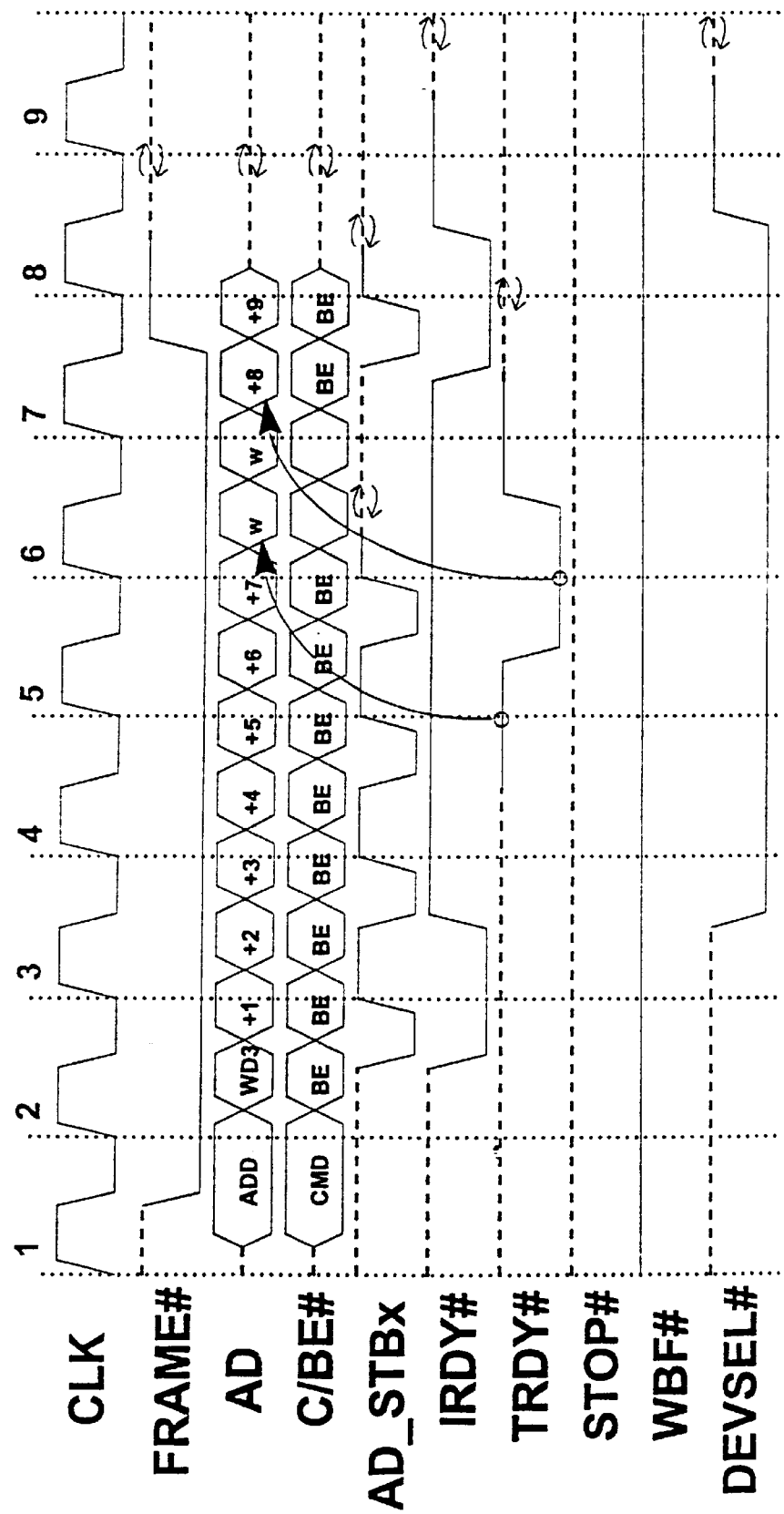

FIG. 4-5 is the same as FIG. 4-3 except the target inserts one waitstate between the first and second blocks of data. Because TRDY# is deasserted on clock 5, a waitstate is inserted on the AD bus on clock 7 if FRAME# remains asserted on clock 6. Because TRDY# and FRAME# are asserted on clock 6, the target is ready to accept data on clock 8. The core logic provides data and asserts IRDY# on clock 8 starting the transfer of the second block of data. This is the only case when an FW transaction follows the standard PCI FRAME#—IRDY# rule. This occurs because the master transfers only one Qword of a subsequent block. In all other cases, FRAME# will be deasserted when IRDY# is deasserted.

The PCI target termination known as retry is not supported for FW transactions. The target does not require this termination because it has WBF#. WBF# prevents the core logic from initiating a FW transaction to the graphics agent, and therefore does not need this termination.

The PCI target termination known as "disconnect with data" is supported for FW transactions. It is the most advantageous implementation of the two disconnect options, since it minimizes the wasted clocks on the interface. Disconnect with data is signaled on the bus when the target claims the access by asserting DEVSEL# and then asserts both STOP# and TRDY# at the TP (which occurs on clock 5). STOP# is used to request that the master stop the transaction and TRDY# is used to indicate the target is willing to transfer the next block of data.

Figures 4, 5, 6:
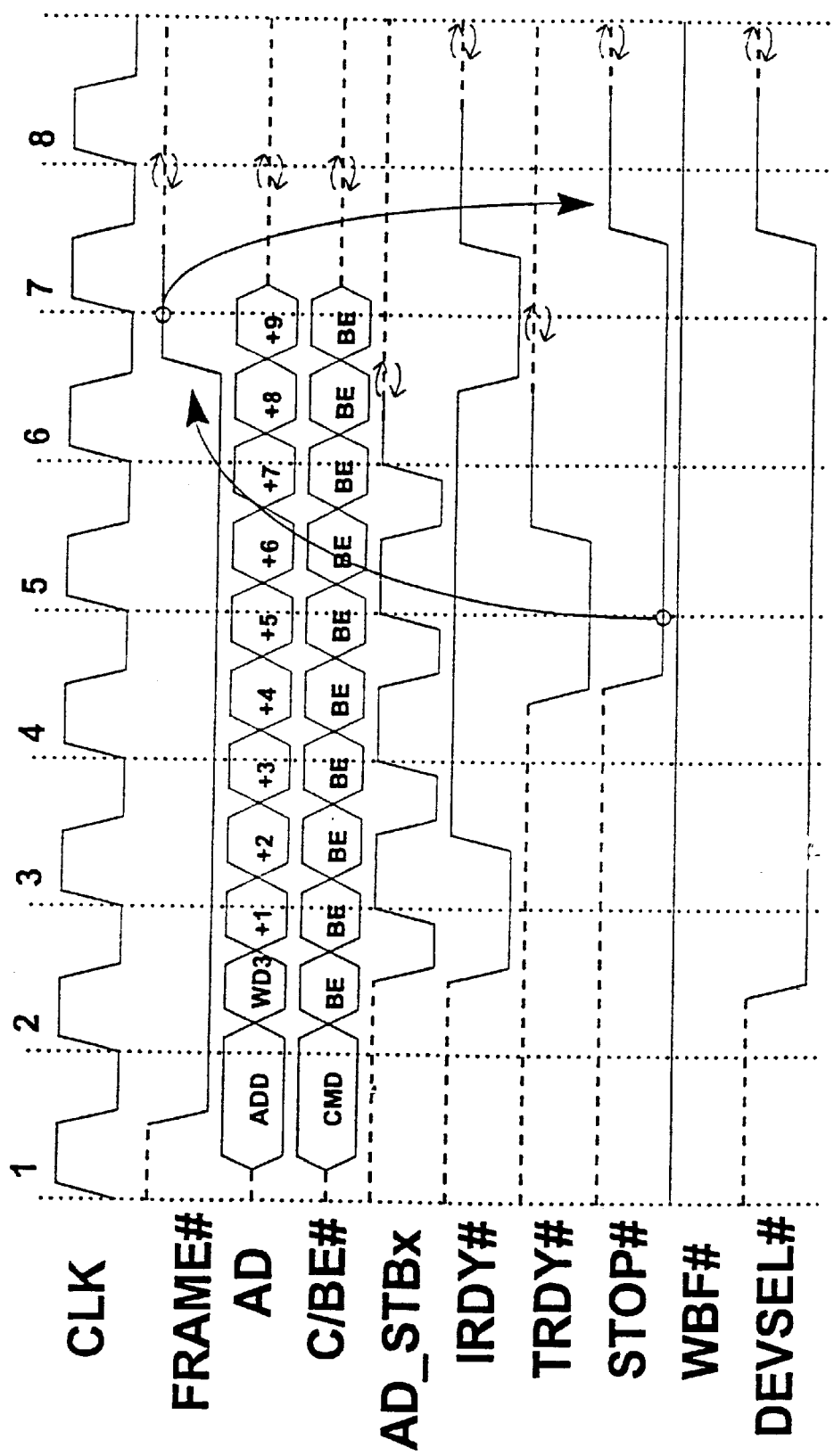
Figures 4, 5, 6, 7:
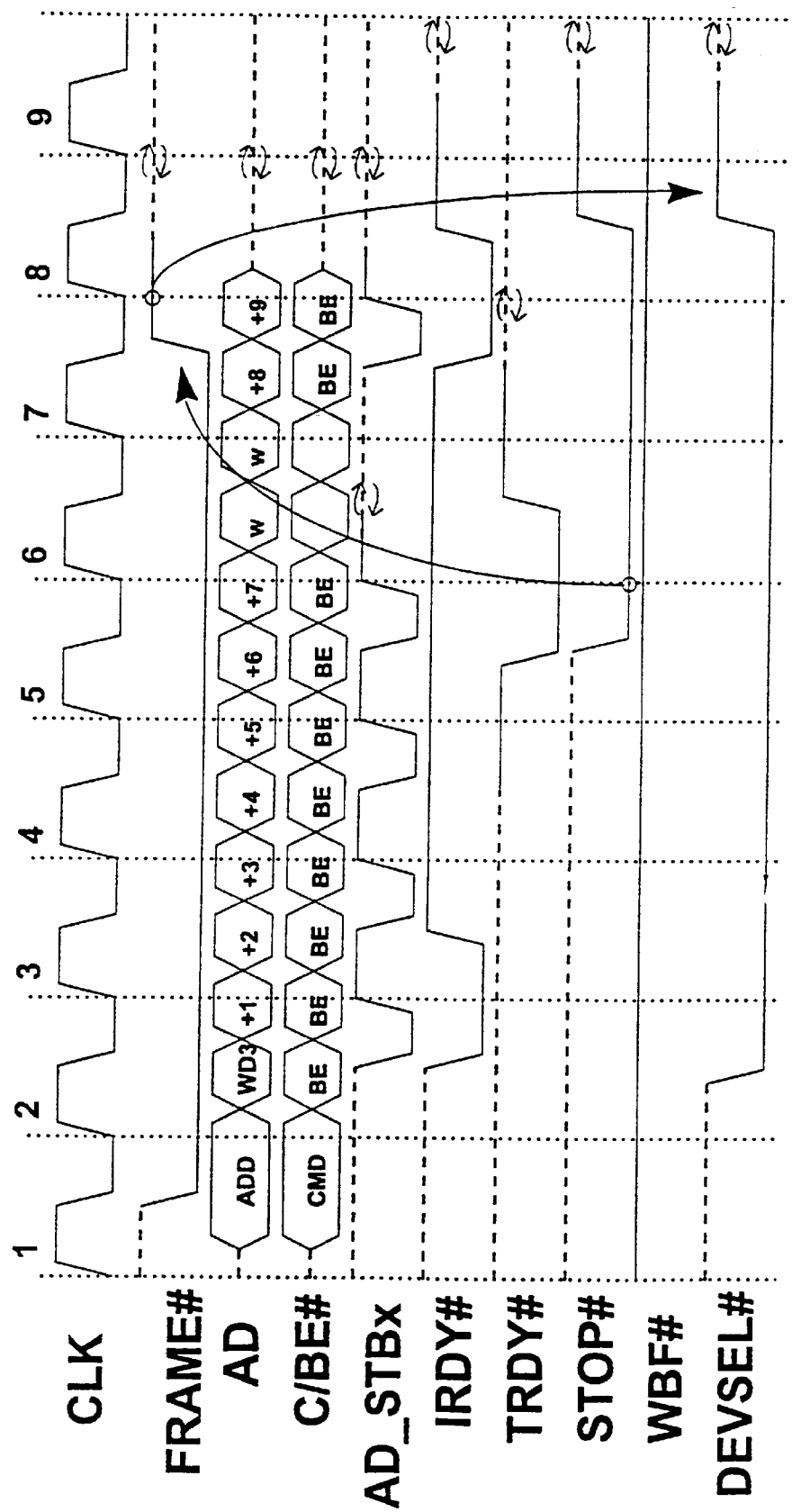
Figures 4, 5, 6, 7, 8:
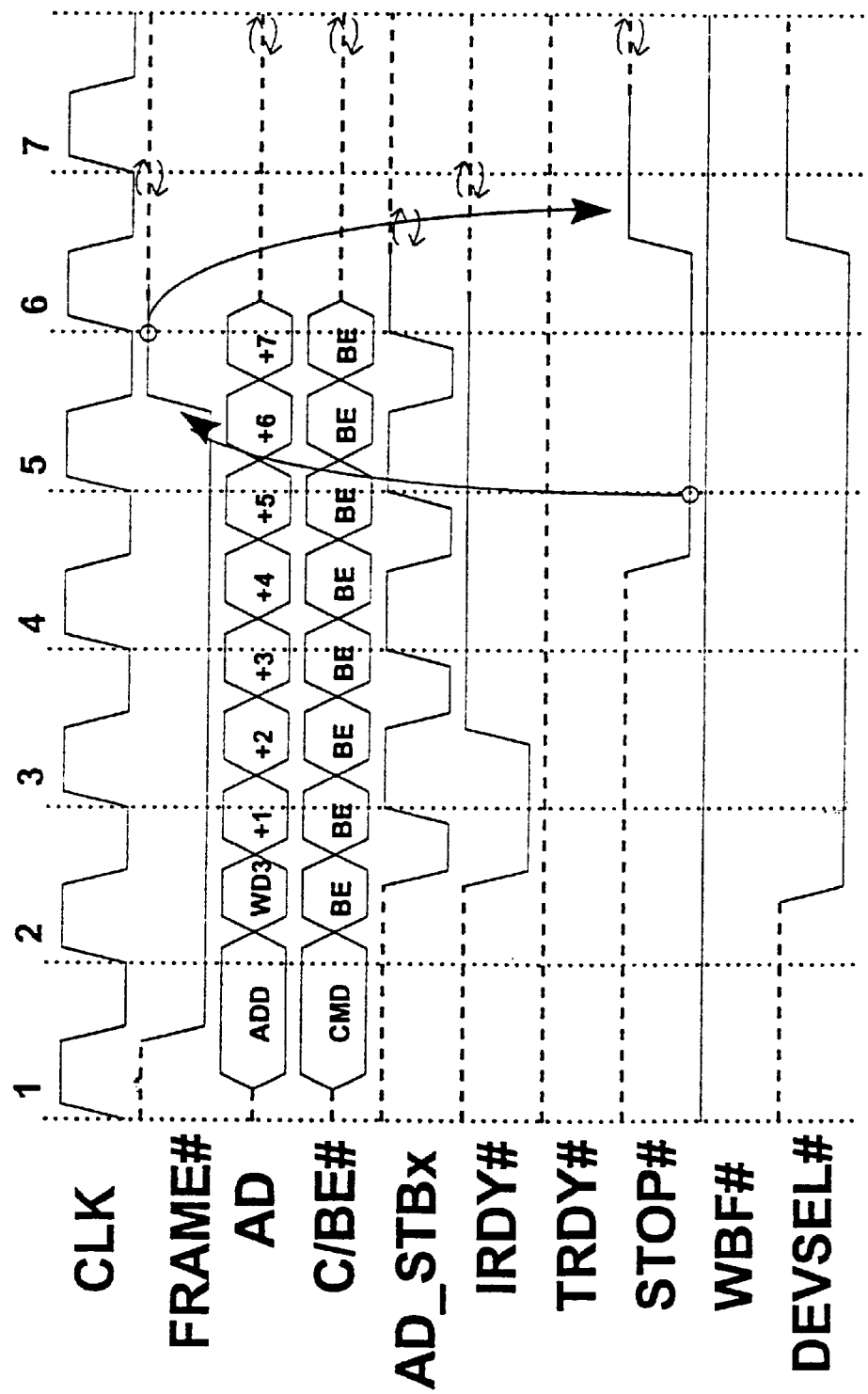
Figures 4, 5, 6, 7, 8, 9:
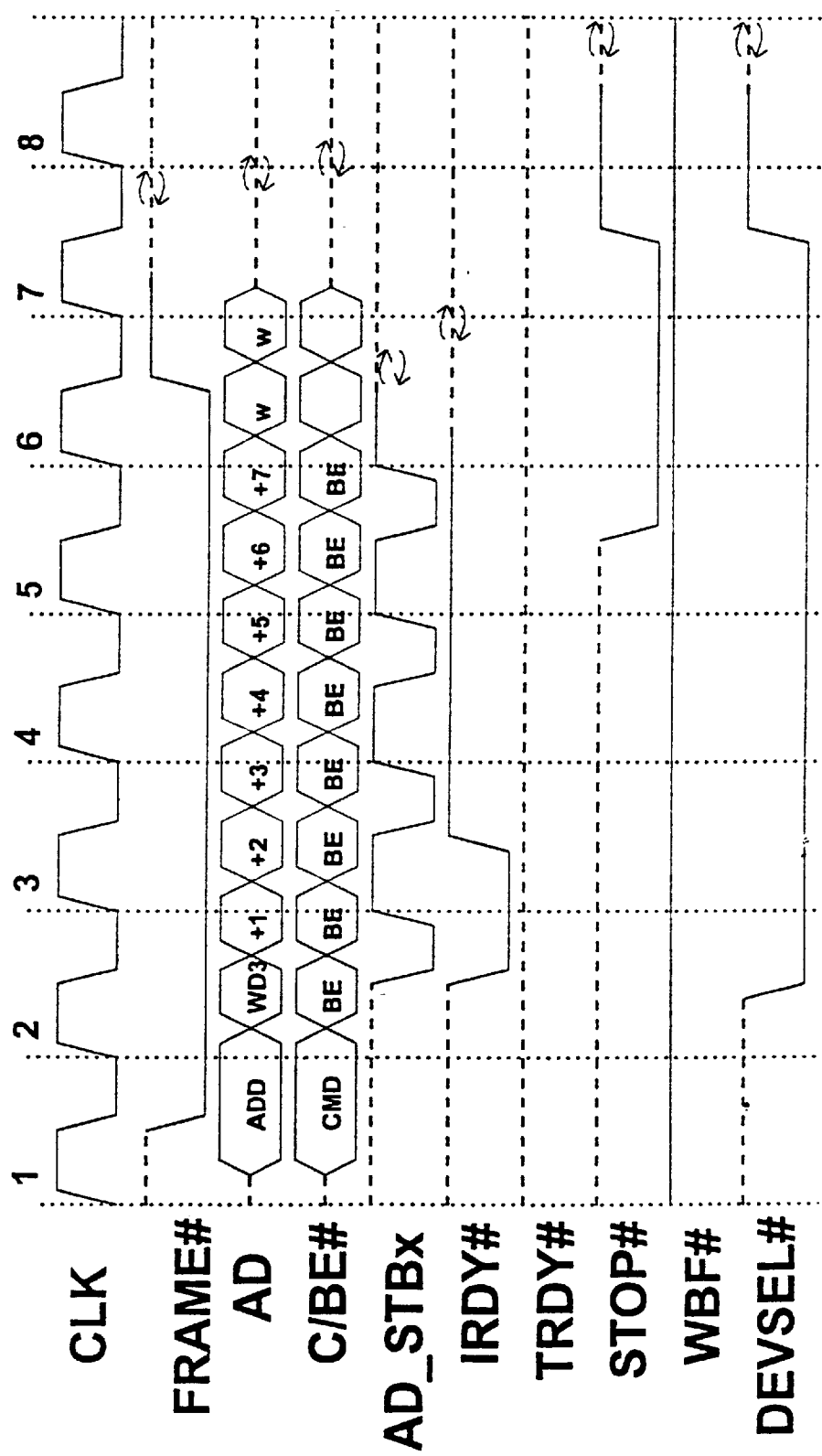
Figures 4, 5, 6, 7, 8, 9, 10:
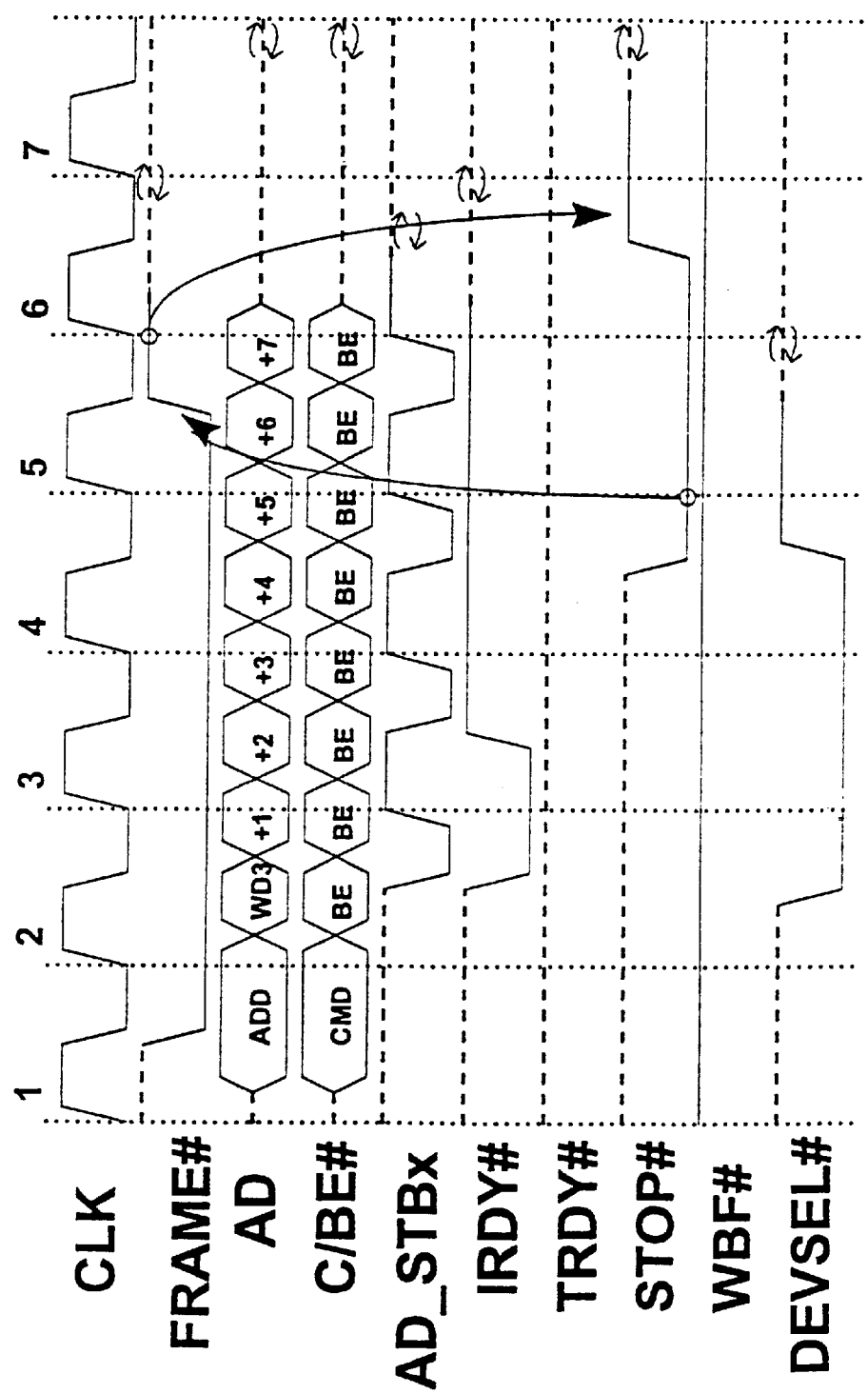
Figures 4, 5, 6, 7, 8, 9, 10, 11:
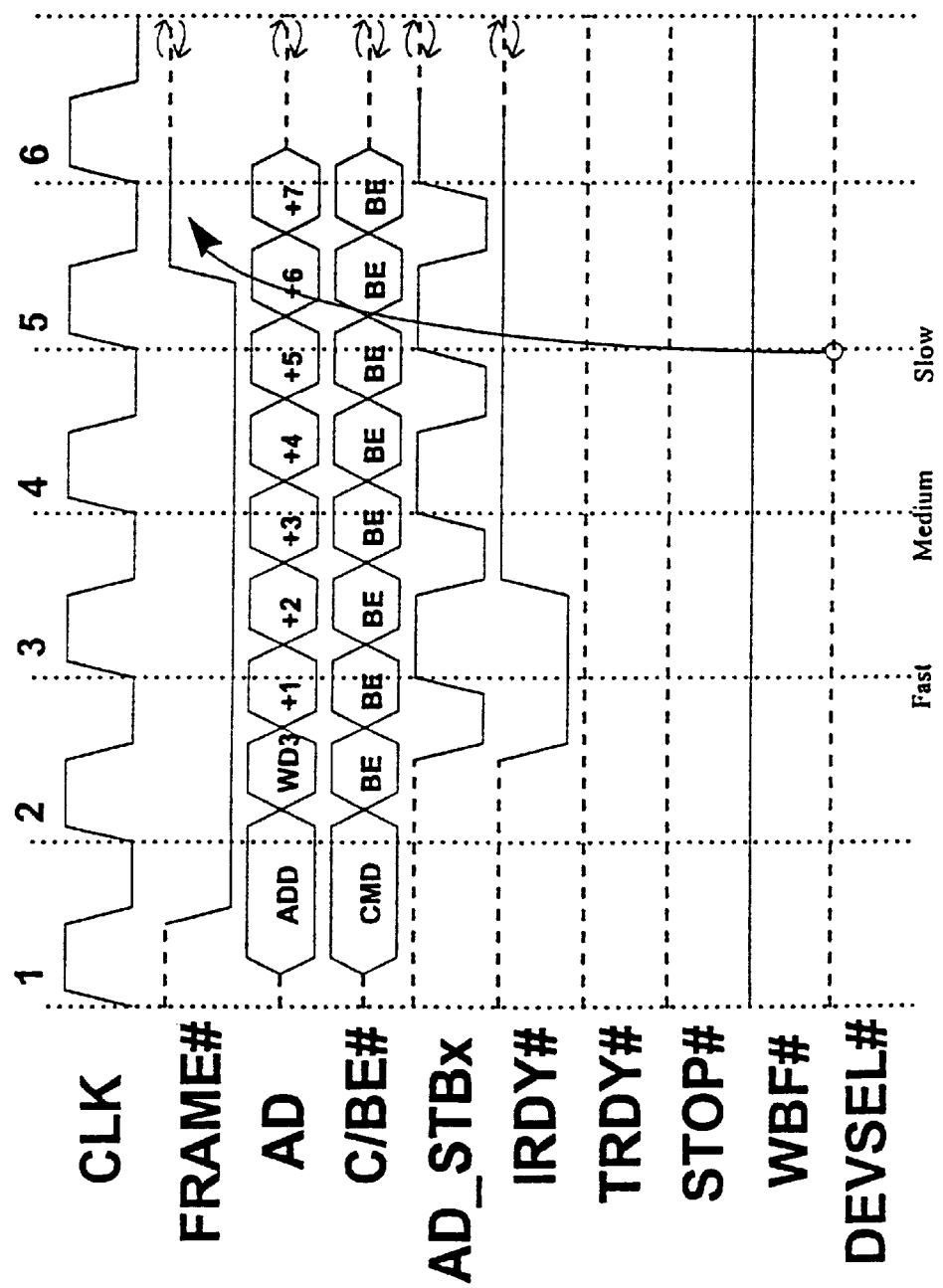
Figures 4, 5, 6, 7, 8, 9, 10, 11, 12:
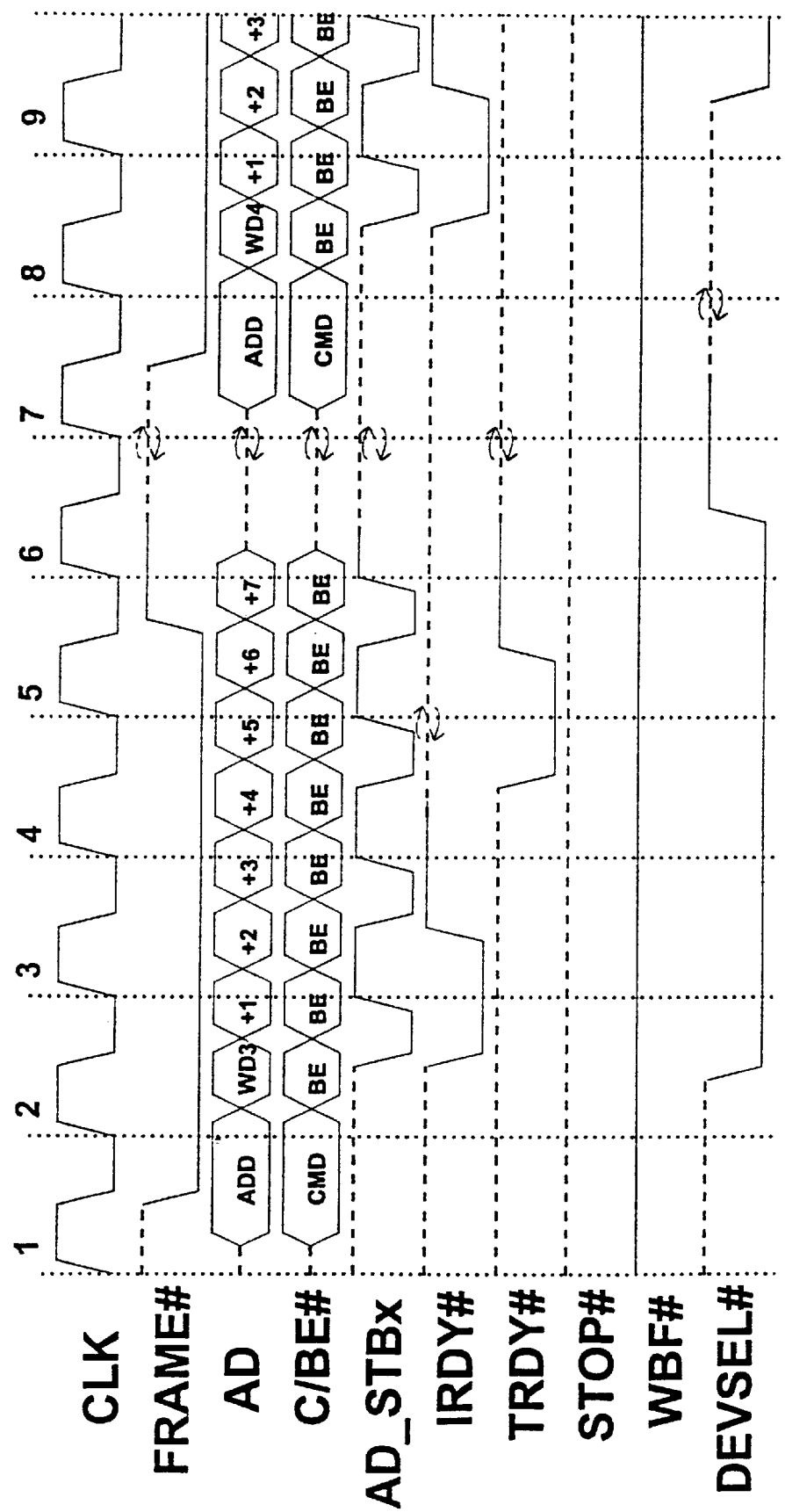
Figures 4, 5, 6, 7, 8, 9, 10, 11, 12, 13:
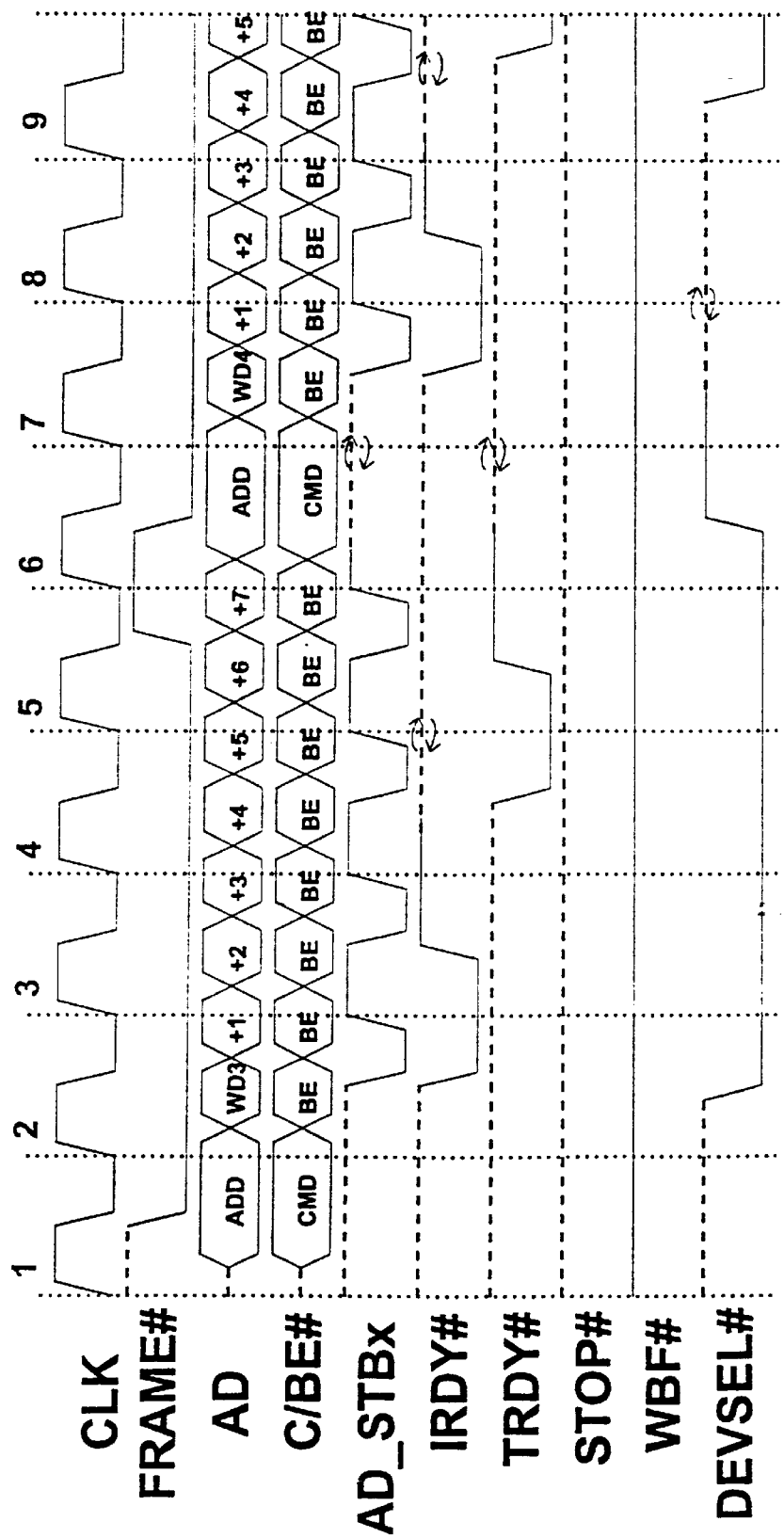
Figures 4, 5, 6, 7, 8, 9, 10, 11, 12, 13, 14:
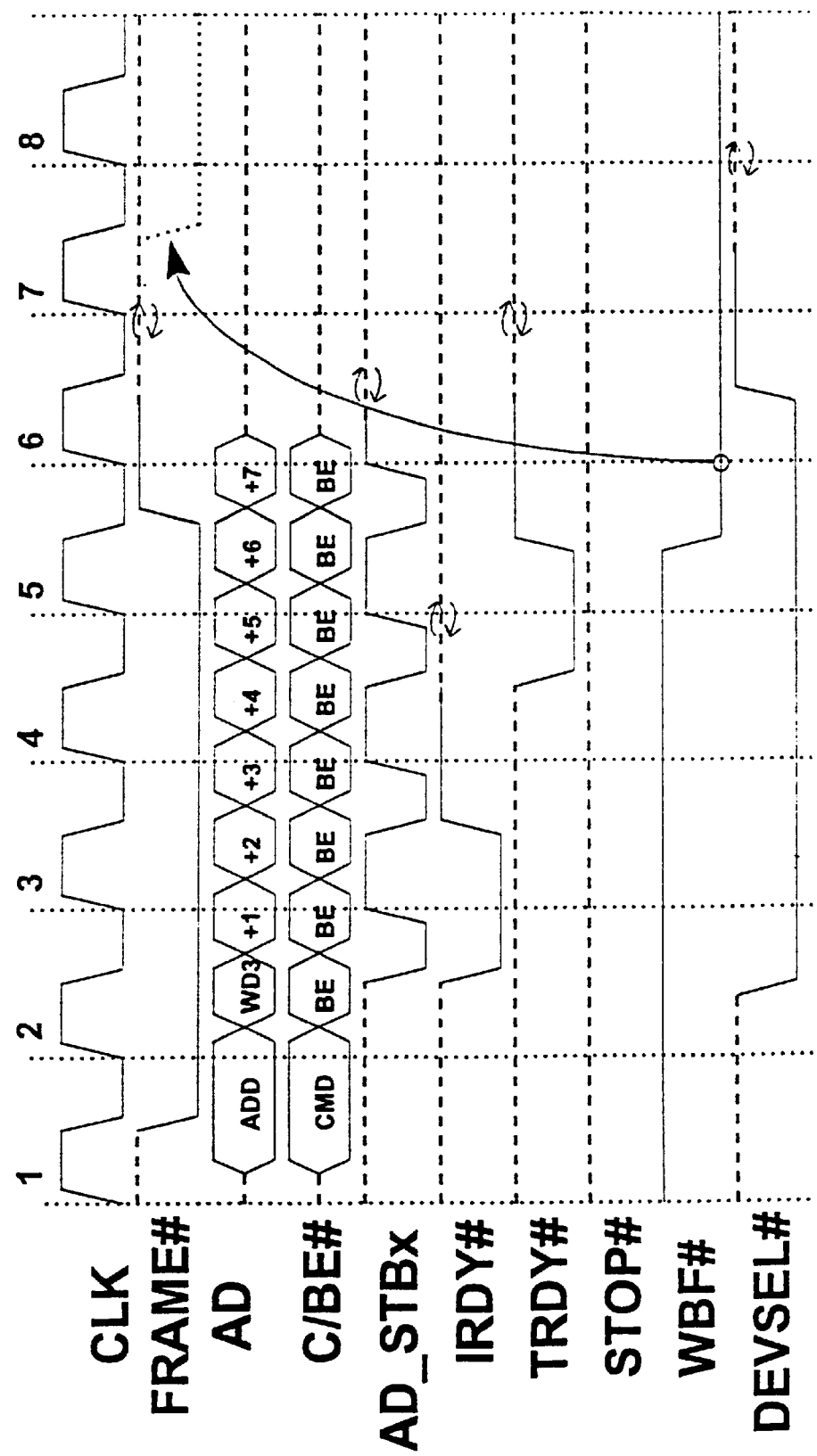
Figures 4, 5, 6, 7, 8, 9, 10, 11, 12, 13, 14, 15:
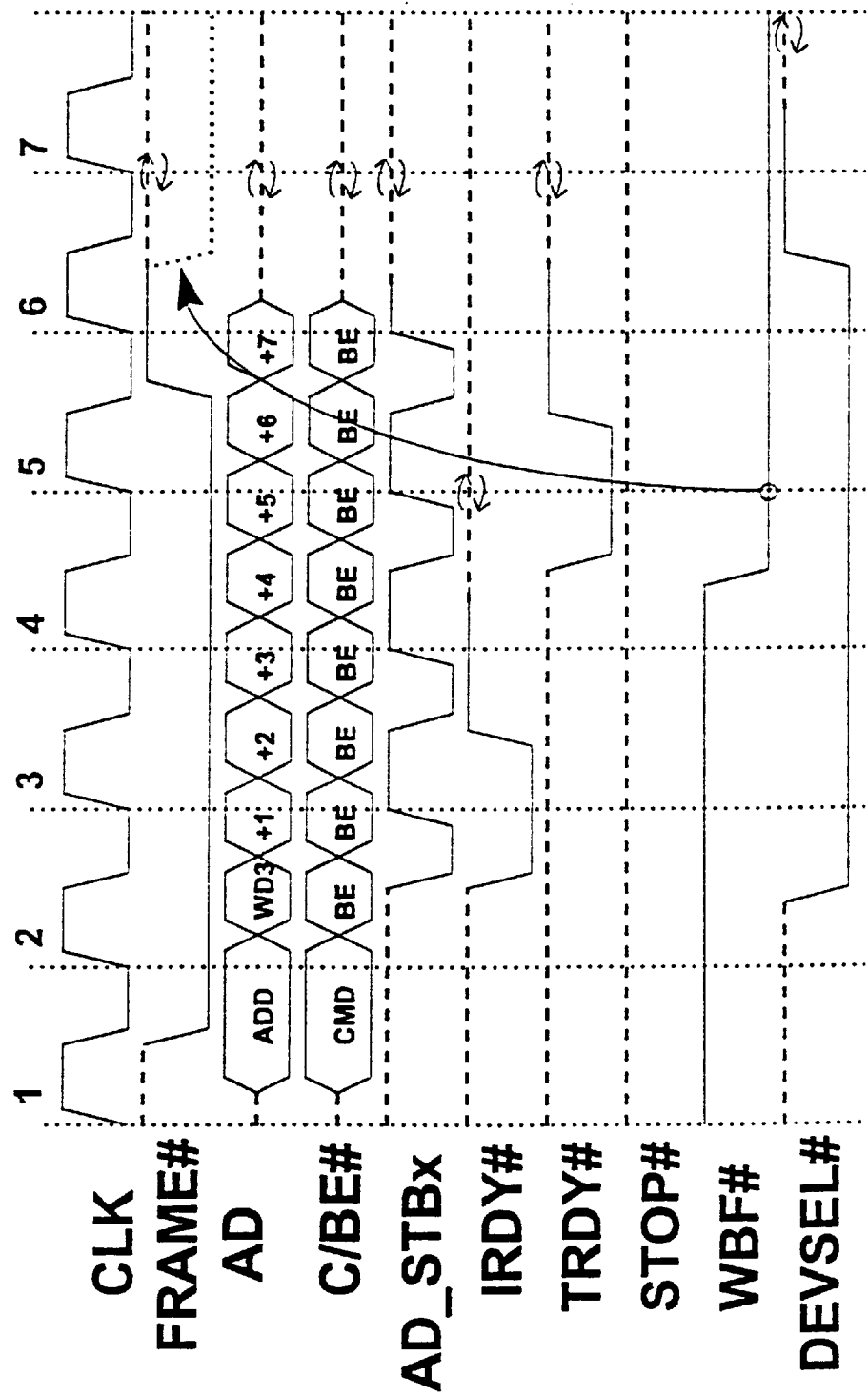
Figures 4, 5, 6, 7, 8, 9, 10, 11, 12, 13, 14, 15, 16:
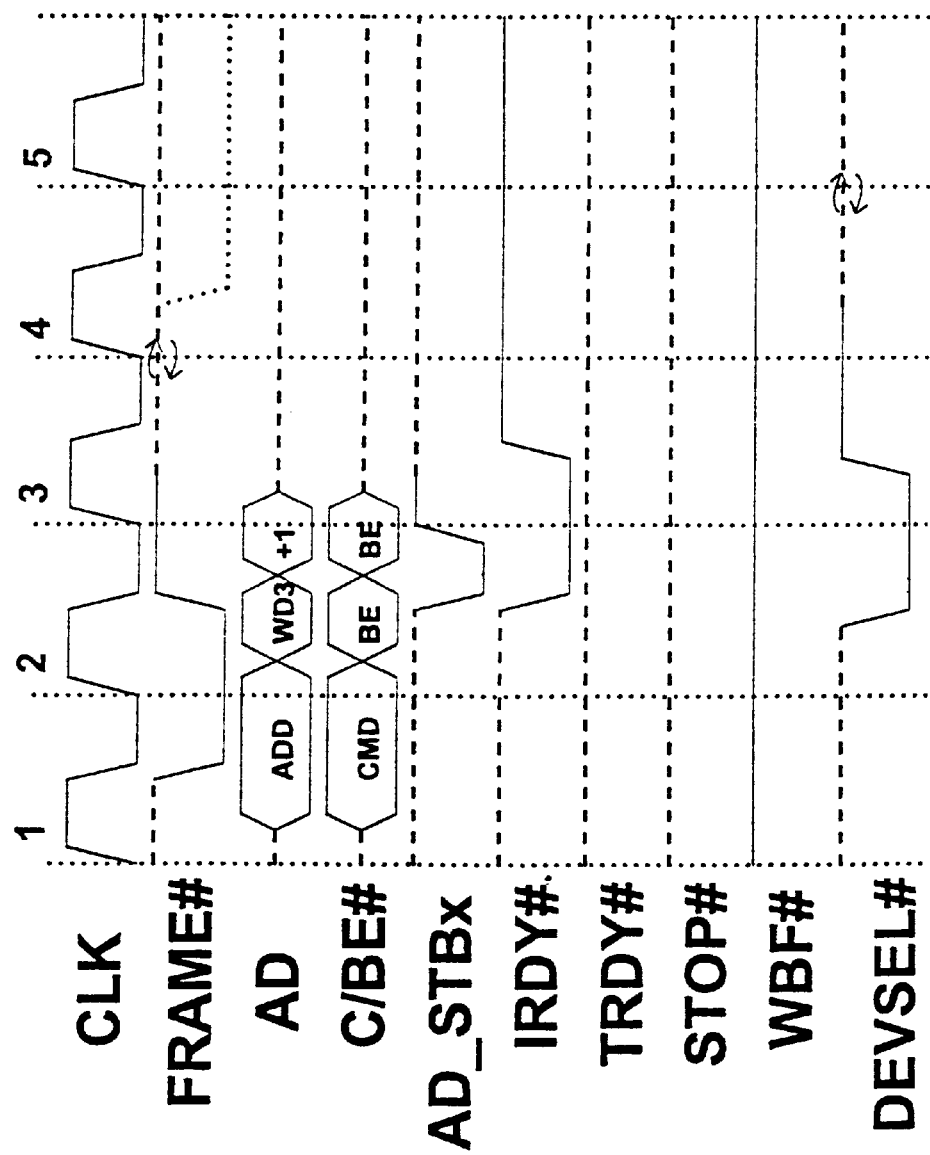
Figures 4, 5, 6, 7, 8, 9, 10, 11, 12, 13, 14, 15, 16, 17:
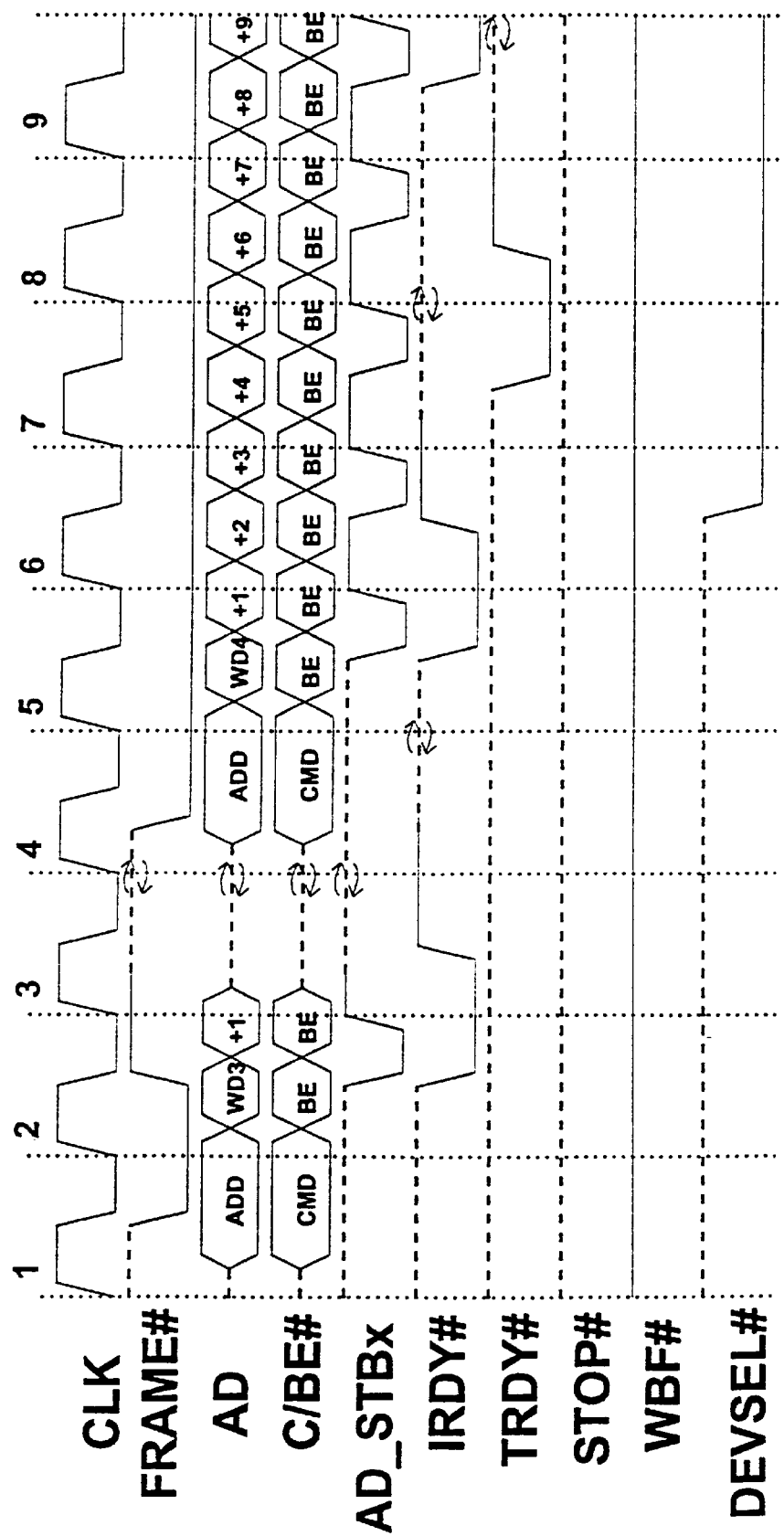
Figures 4, 5, 6, 7, 8, 9, 10, 11, 12, 13, 14, 15, 16, 17, 18:
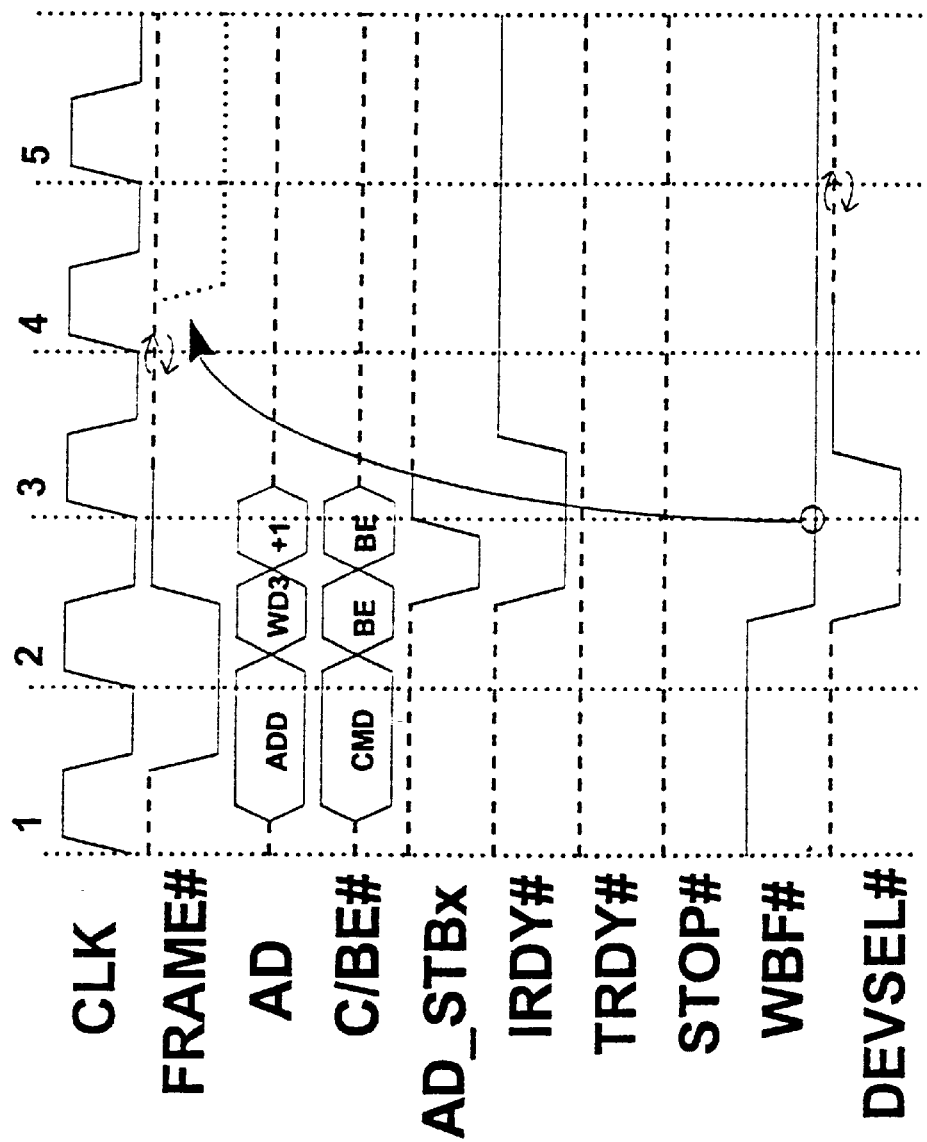
Figures 4, 5, 6, 7, 8, 9, 10, 11, 12, 13, 14, 15, 16, 17, 18, 19:
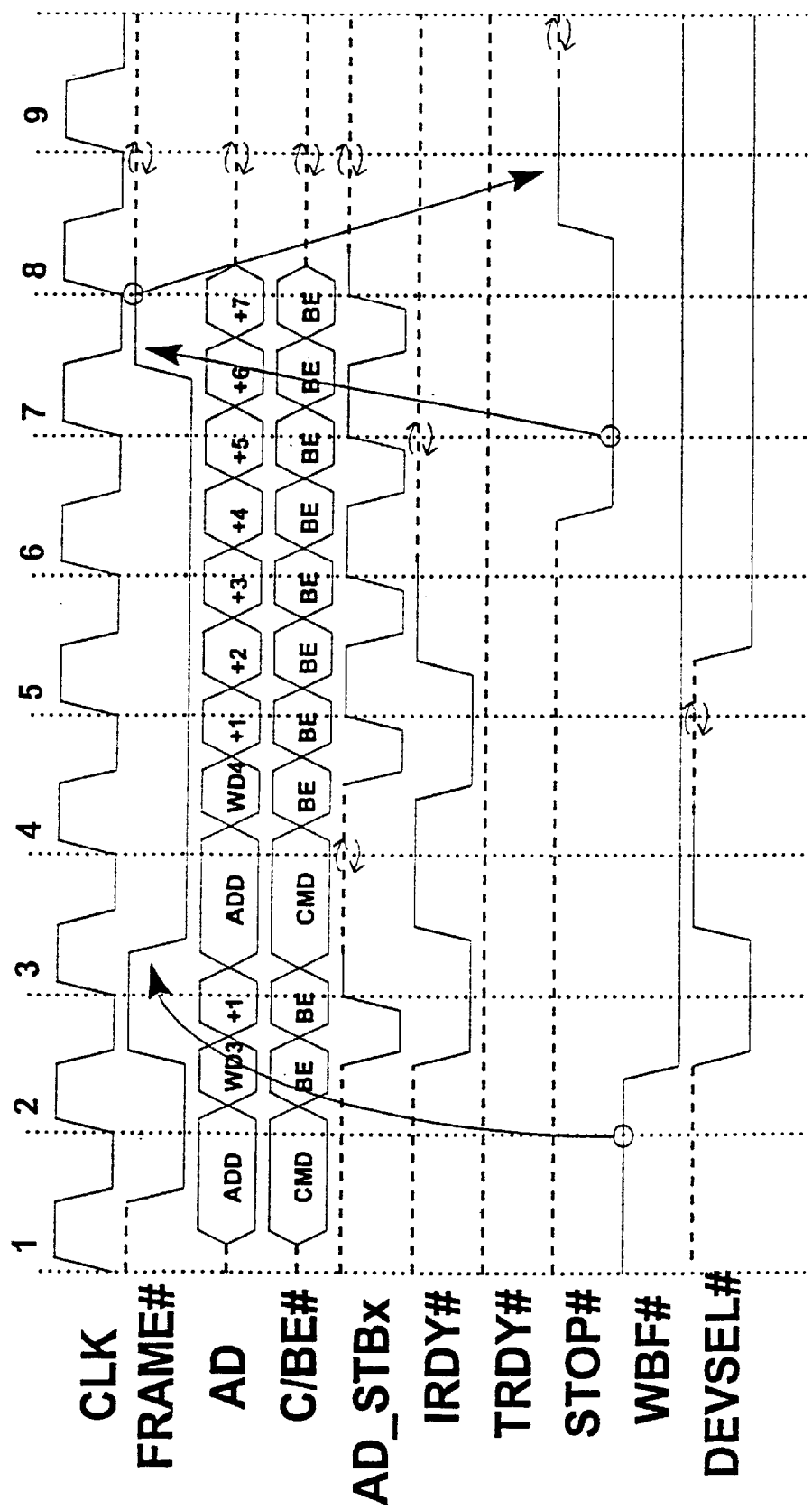
Figures 4, 5, 6, 7, 8, 9, 10, 11, 12, 13, 14, 15, 16, 17, 18, 19, 20:
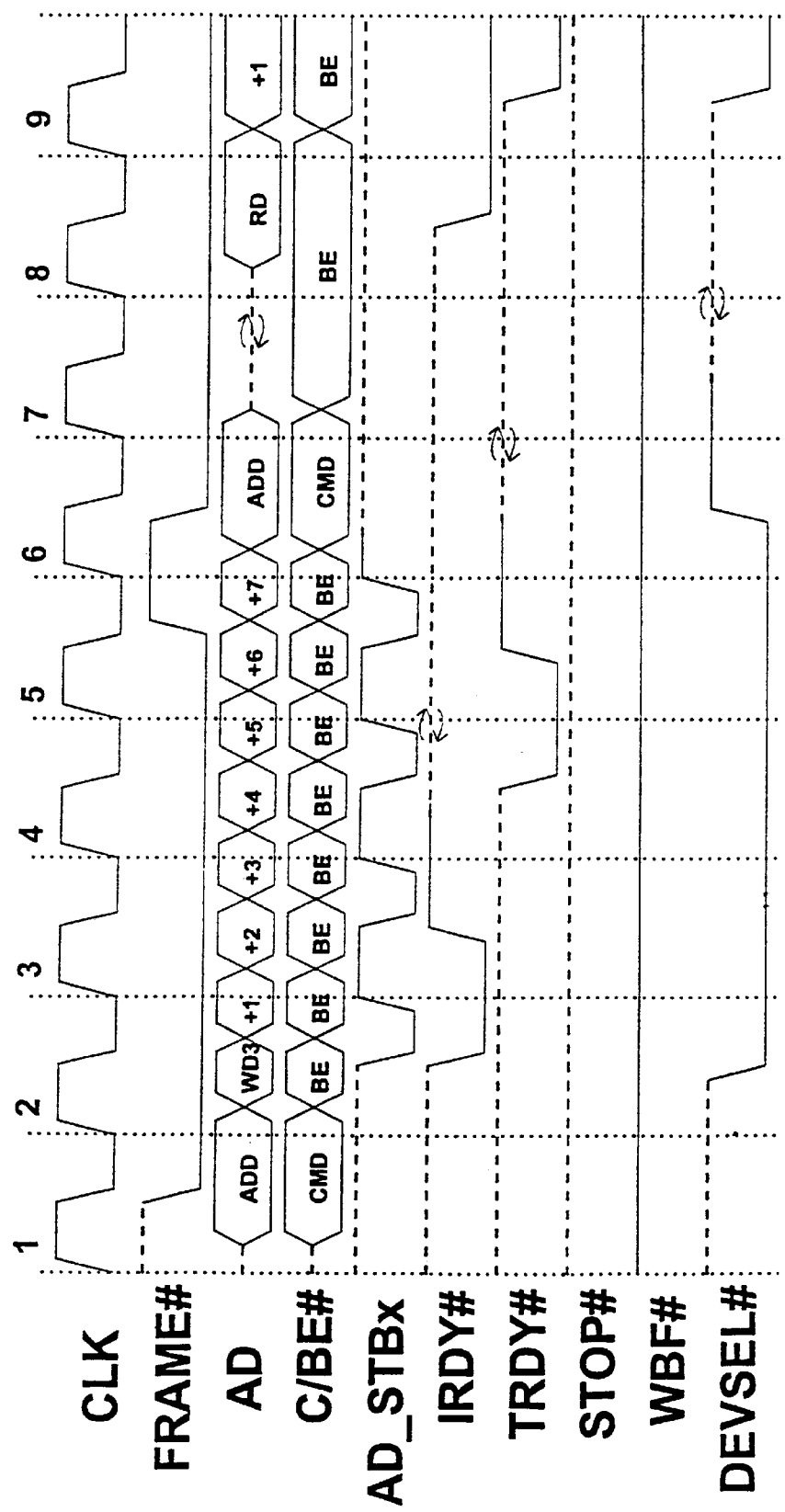
Figures 4, 5, 6, 7, 8, 9, 10, 11, 12, 13, 14, 15, 16, 17, 18, 19, 20, 21:
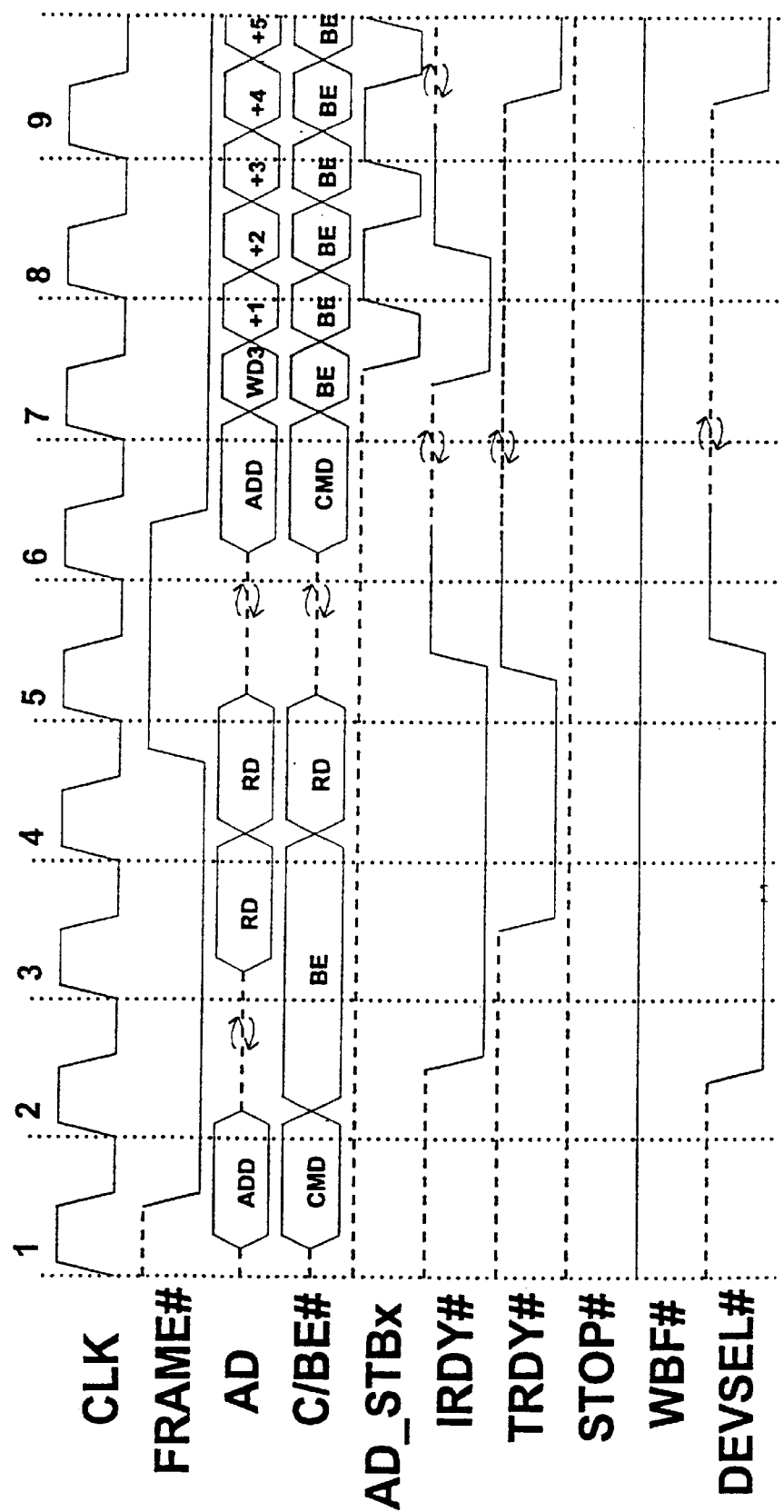
Figures 4, 5, 6, 7, 8, 9, 10, 11, 12, 13, 14, 15, 16, 17, 18, 19, 20, 21, 22:
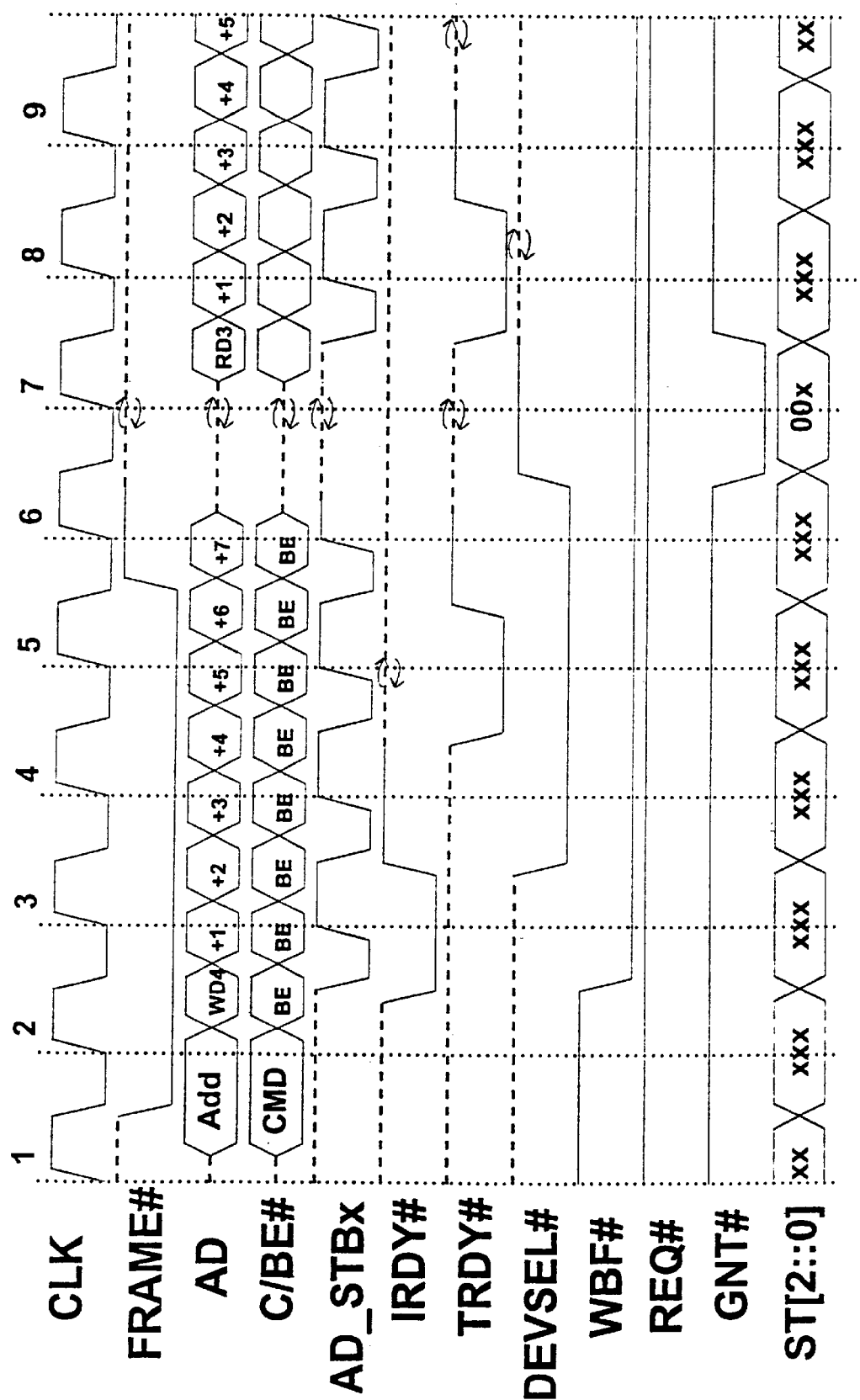
Figures 4, 5, 6, 7, 8, 9, 10, 11, 12, 13, 14, 15, 16, 17, 18, 19, 20, 21, 22, 23:
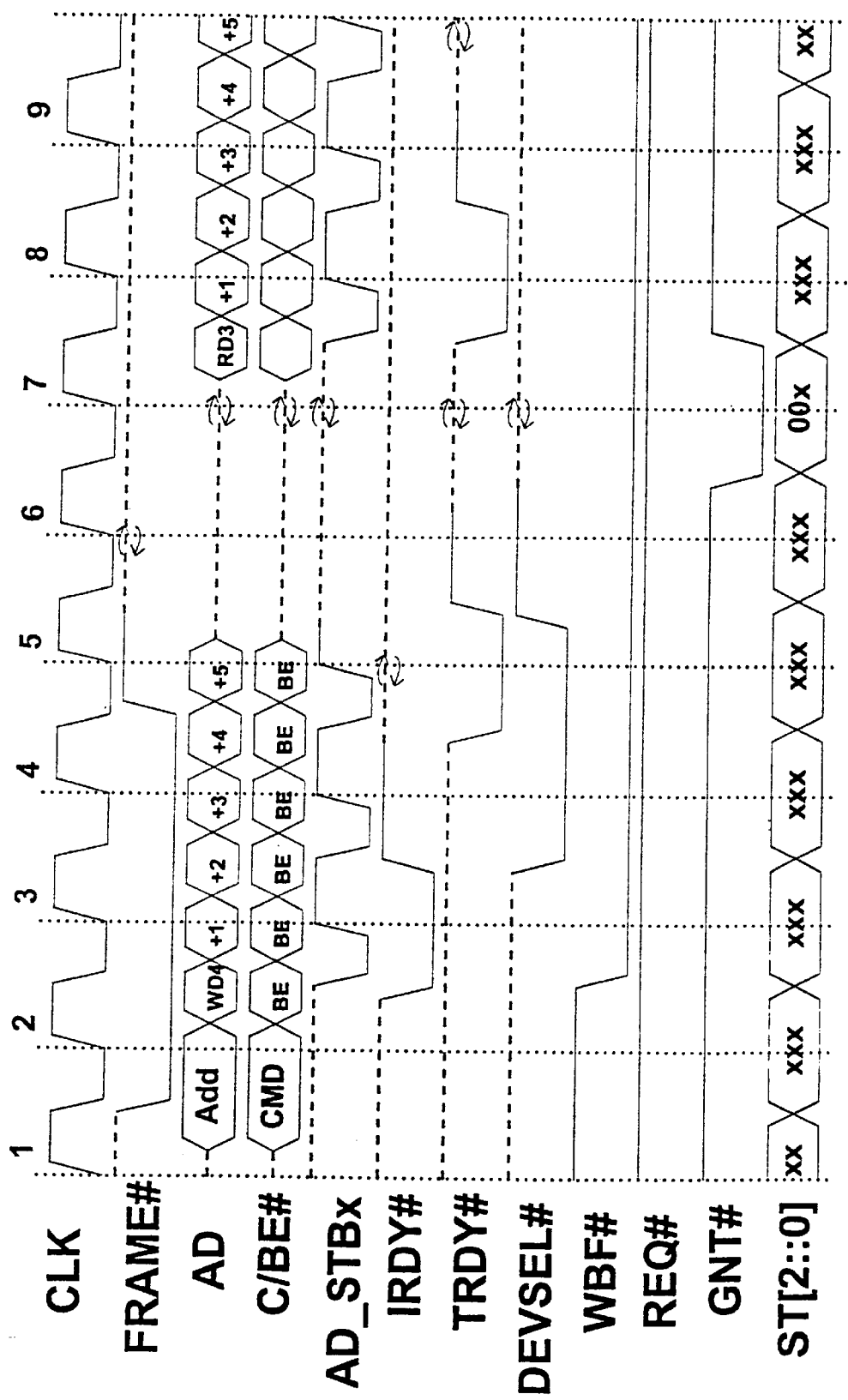
Figures 4, 5, 6, 7, 8, 9, 10, 11, 12, 13, 14, 15, 16, 17, 18, 19, 20, 21, 22, 23, 24:
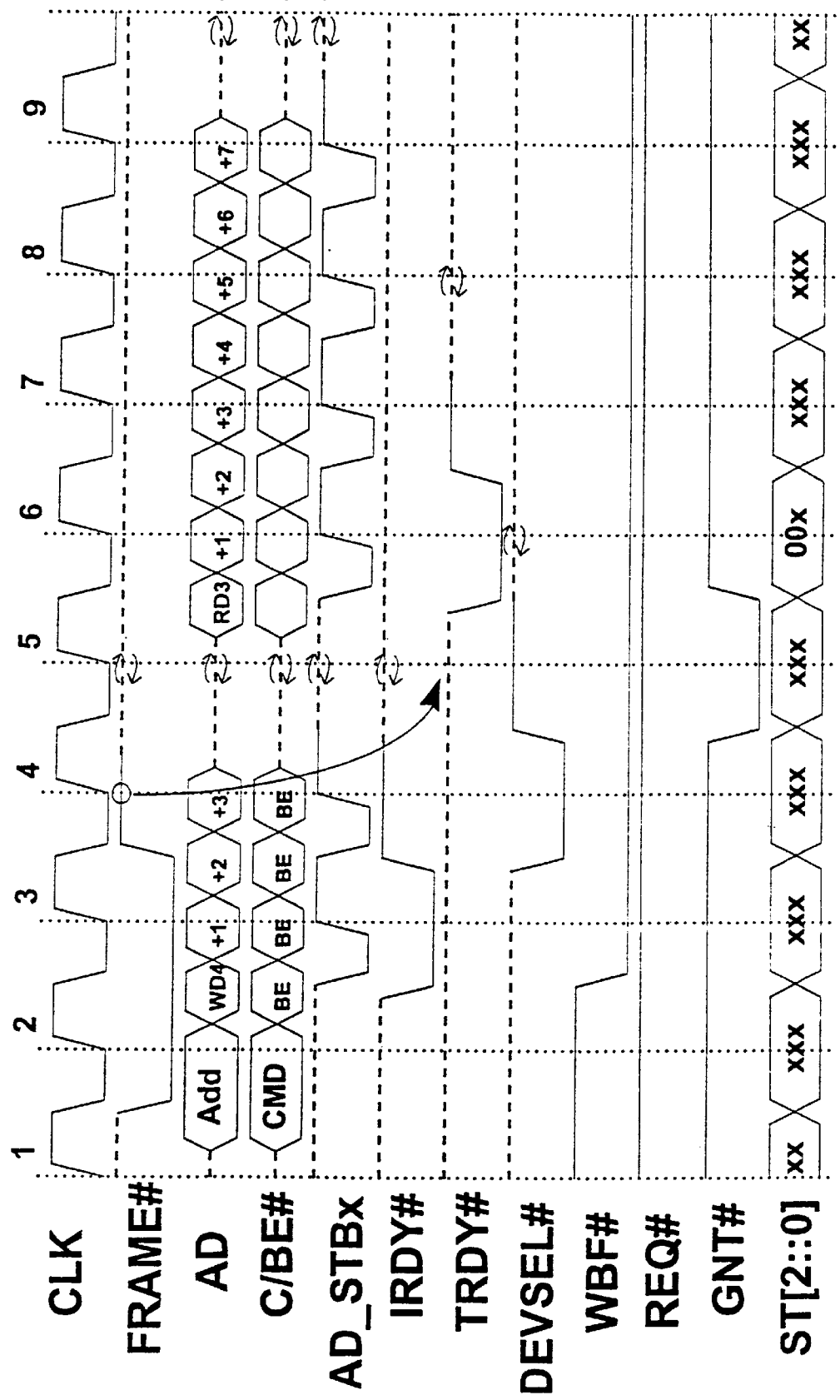
Figures 4, 5, 6, 7, 8, 9, 10, 11, 12, 13, 14, 15, 16, 17, 18, 19, 20, 21, 22, 23, 24, 25:
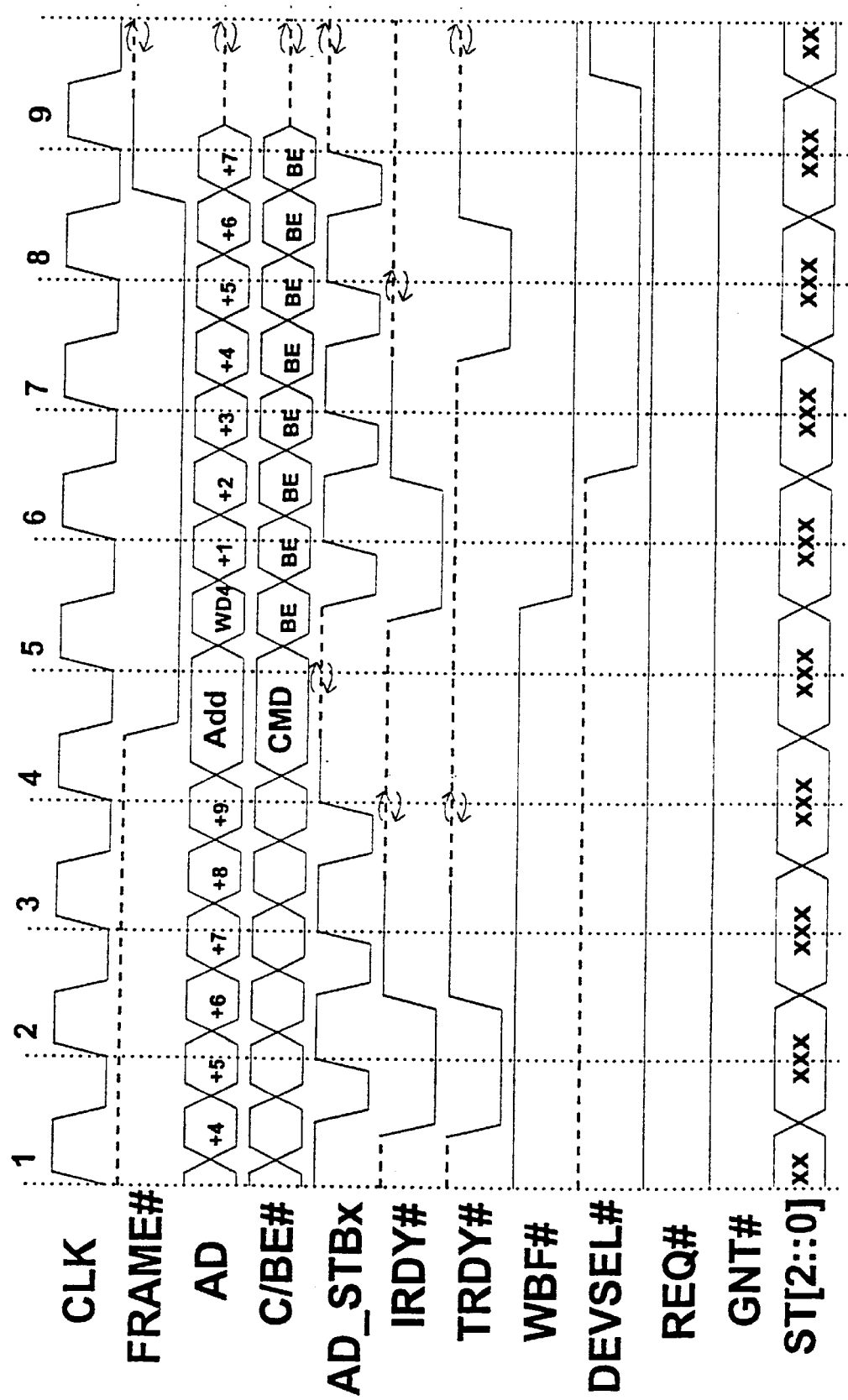
Figures 4, 5, 6, 7, 8, 9, 10, 11, 12, 13, 14, 15, 16, 17, 18, 19, 20, 21, 22, 23, 24, 25, 26:
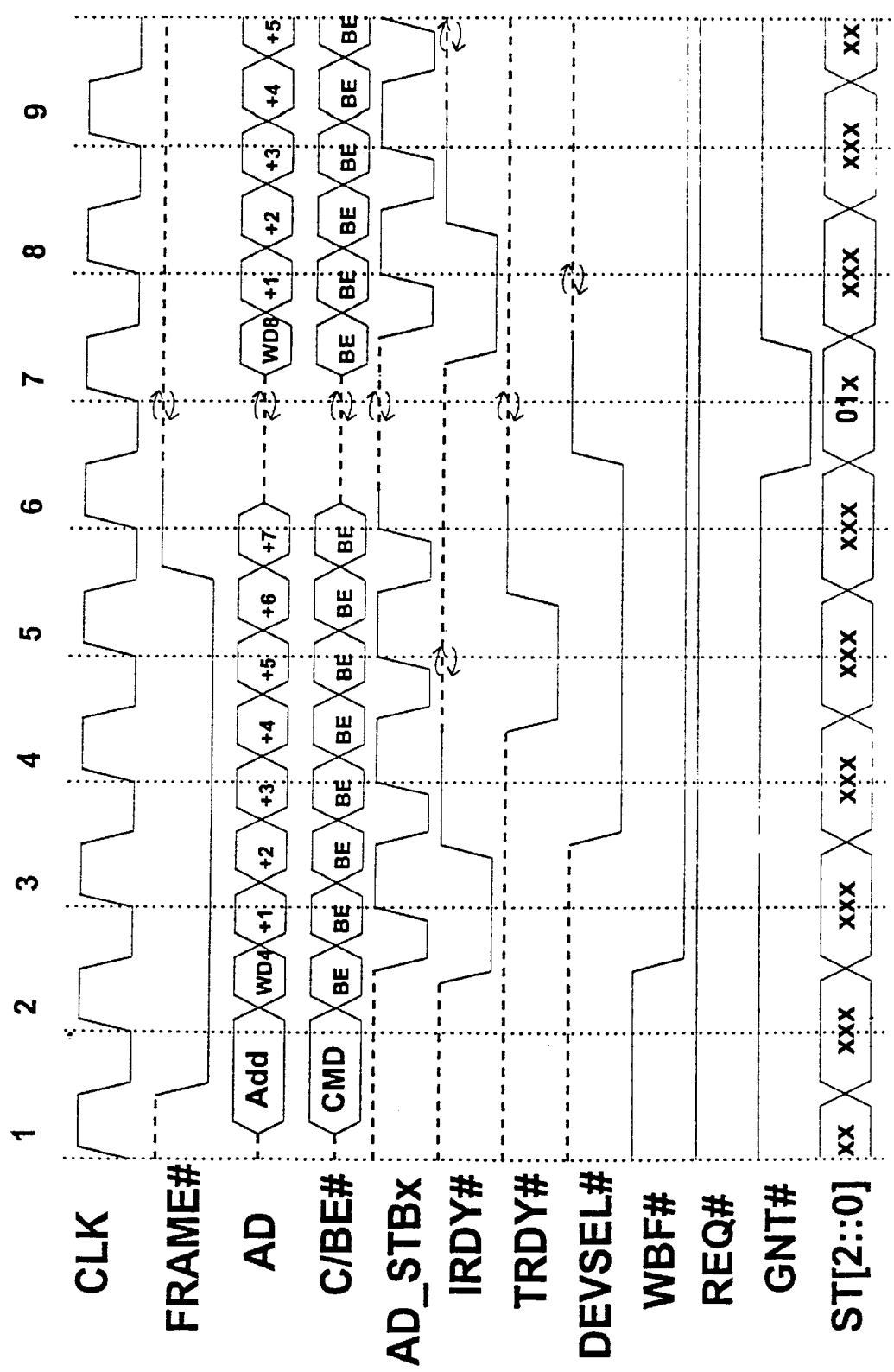
Figures 4, 5, 6, 7, 8, 9, 10, 11, 12, 13, 14, 15, 16, 17, 18, 19, 20, 21, 22, 23, 24, 25, 26, 27:
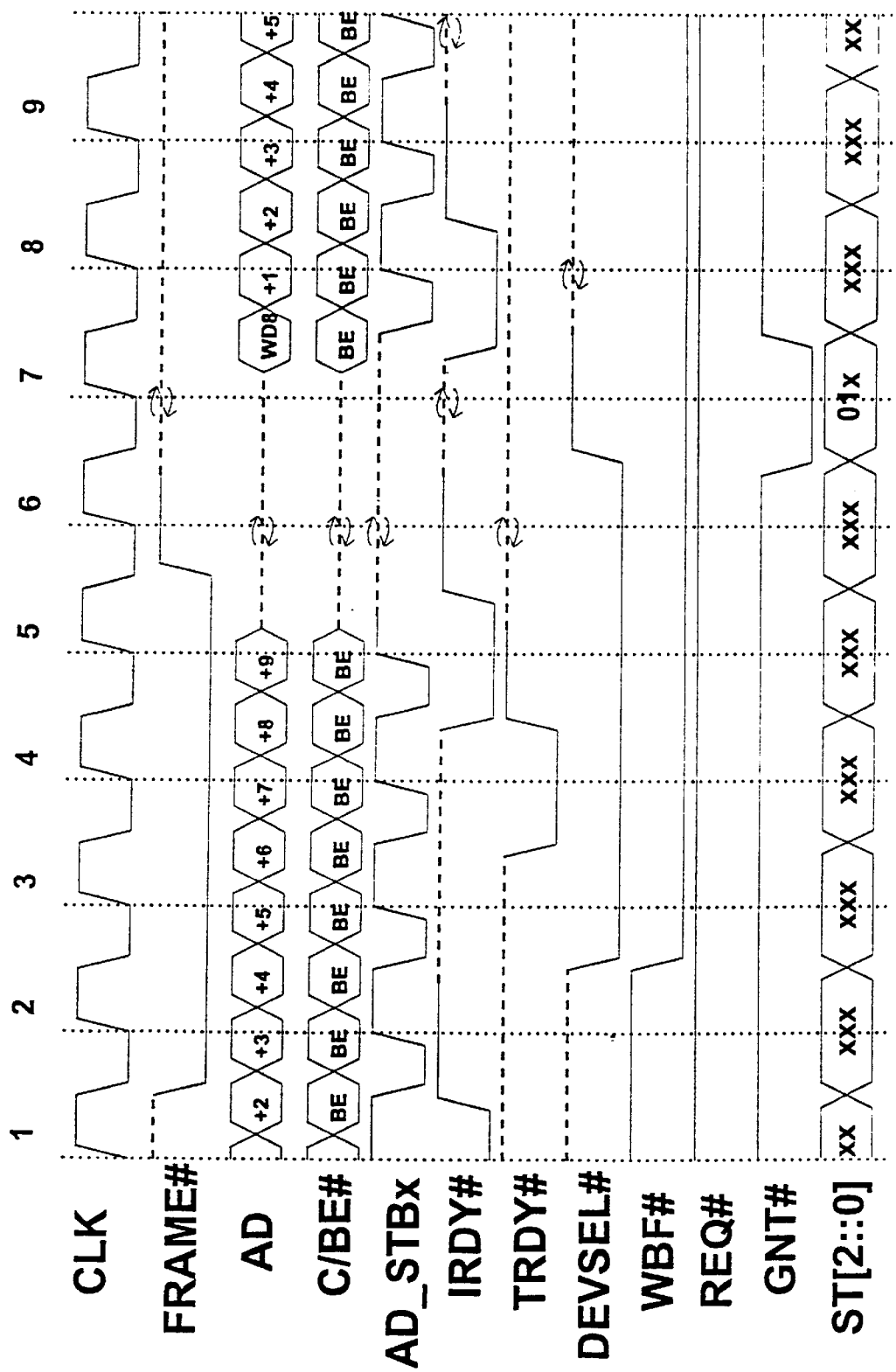
Figures 4, 5, 6, 7, 8, 9, 10, 11, 12, 13, 14, 15, 16, 17, 18, 19, 20, 21, 22, 23, 24, 25, 26, 27, 28:
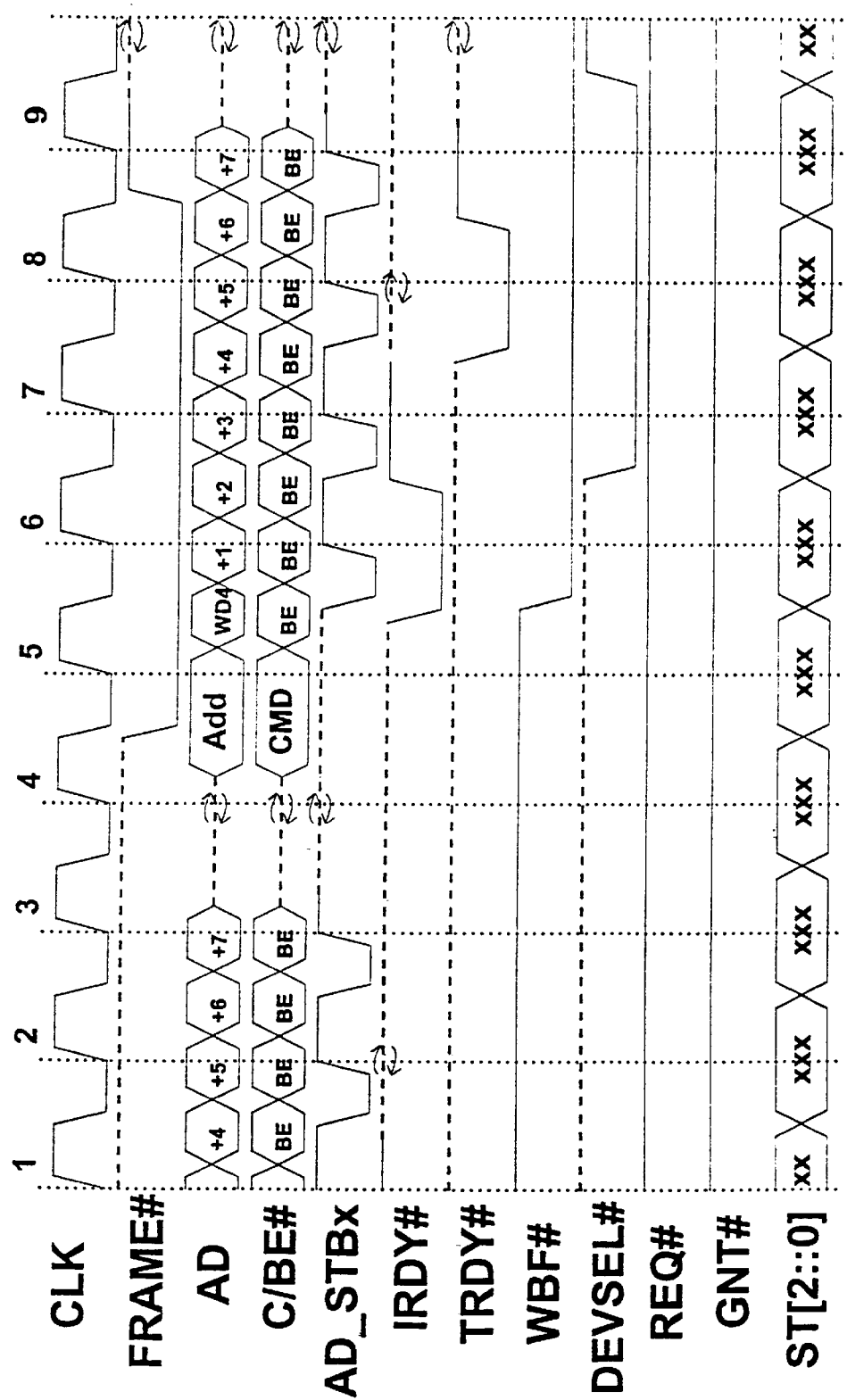
Figures 4, 5, 6, 7, 8, 9, 10, 11, 12, 13, 14, 15, 16, 17, 18, 19, 20, 21, 22, 23, 24, 25, 26, 27, 28, 29:
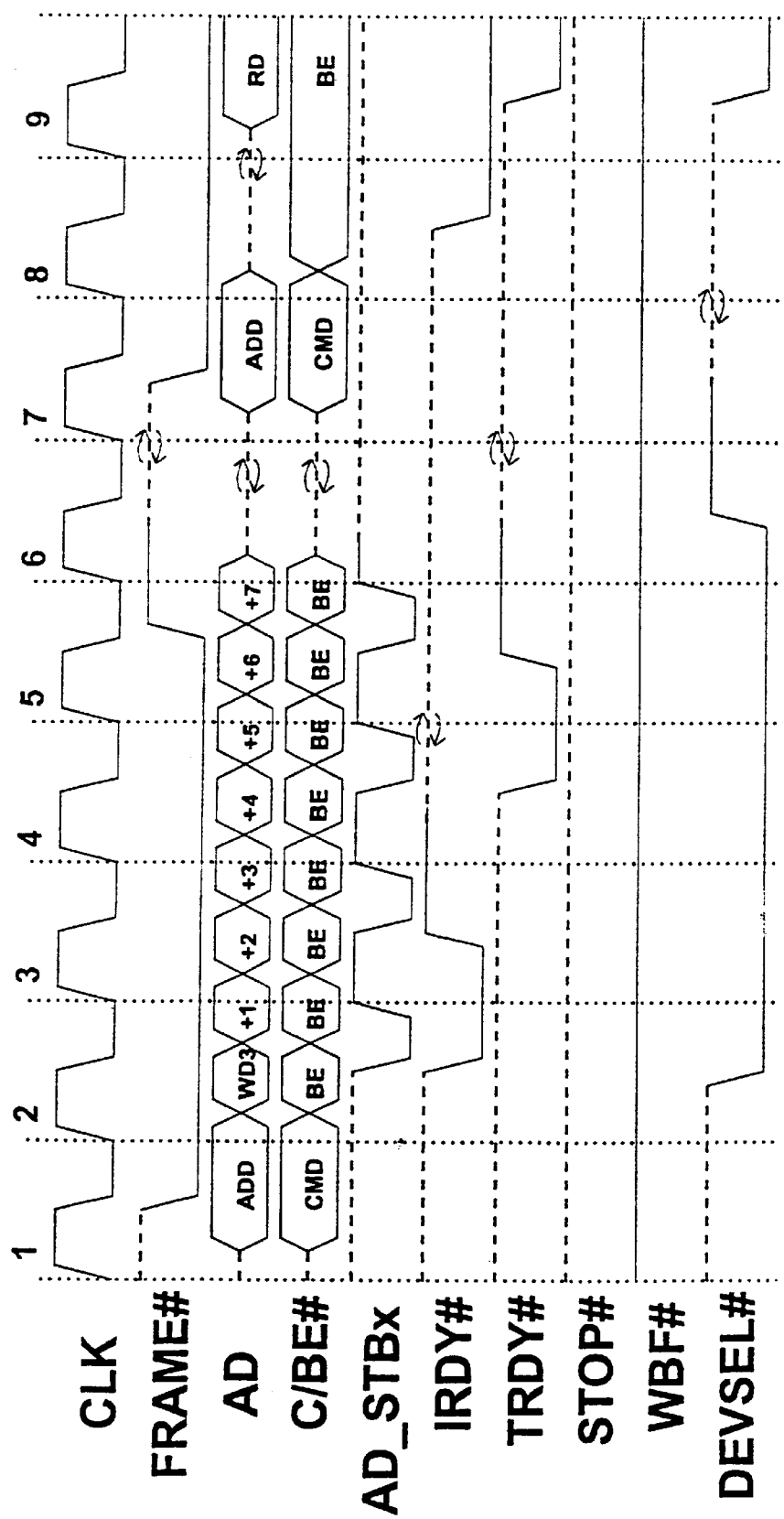
Figures 4, 5, 6, 7, 8, 9, 10, 11, 12, 13, 14, 15, 16, 17, 18, 19, 20, 21, 22, 23, 24, 25, 26, 27, 28, 29, 30:
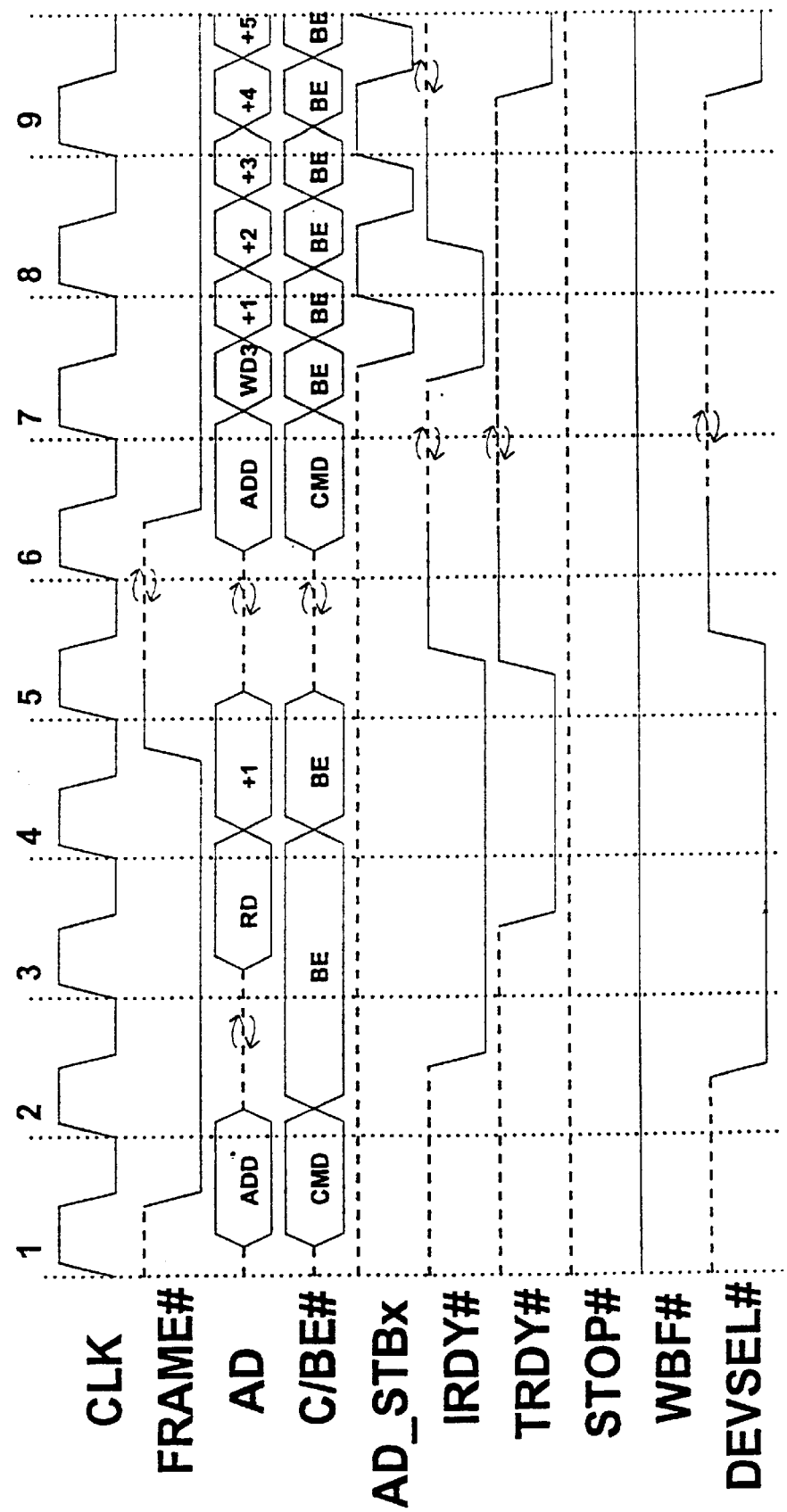
Figures 4, 5, 6, 7, 8, 9, 10, 11, 12, 13, 14, 15, 16, 17, 18, 19, 20, 21, 22, 23, 24, 25, 26, 27, 28, 29, 30, 31:
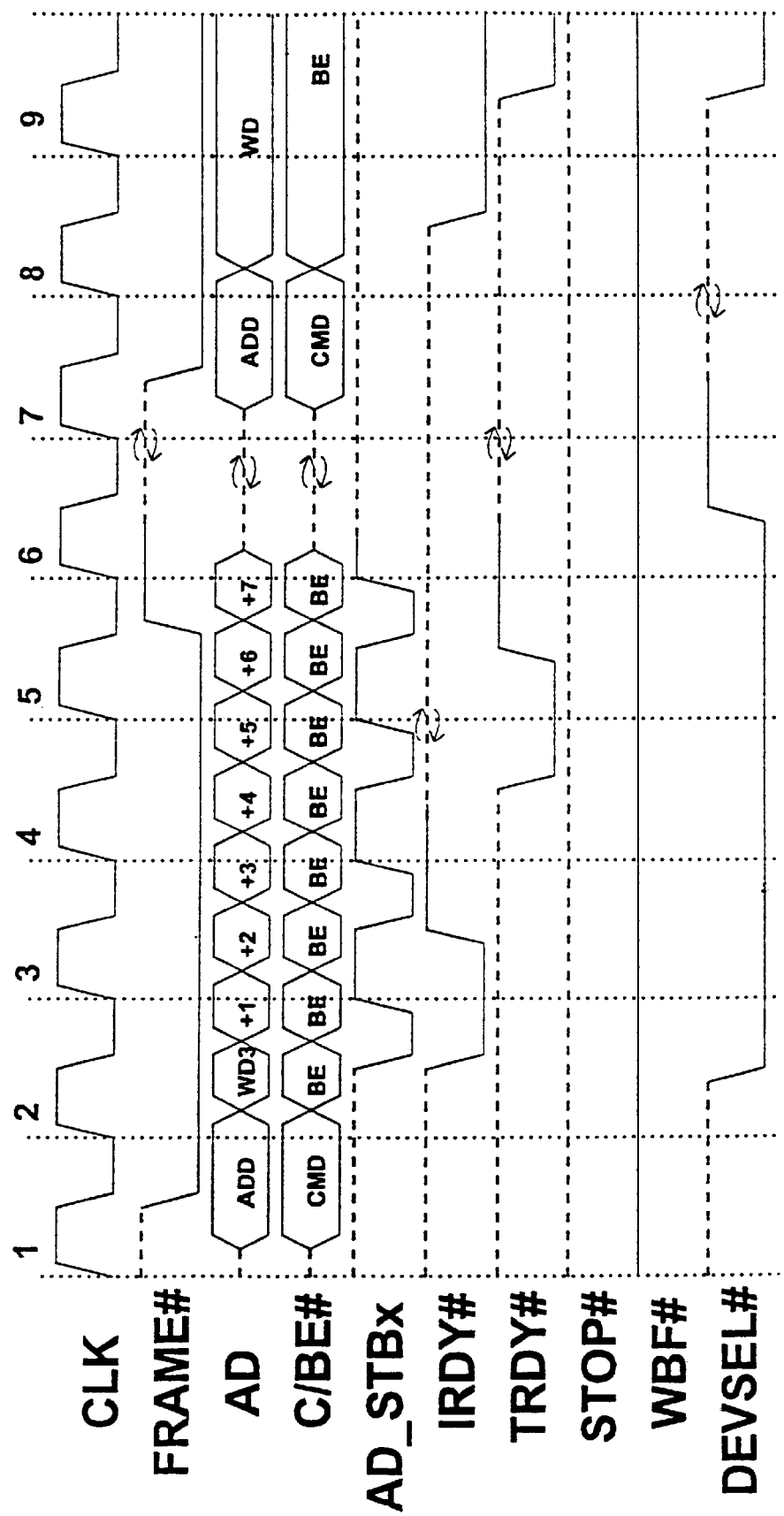
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32:
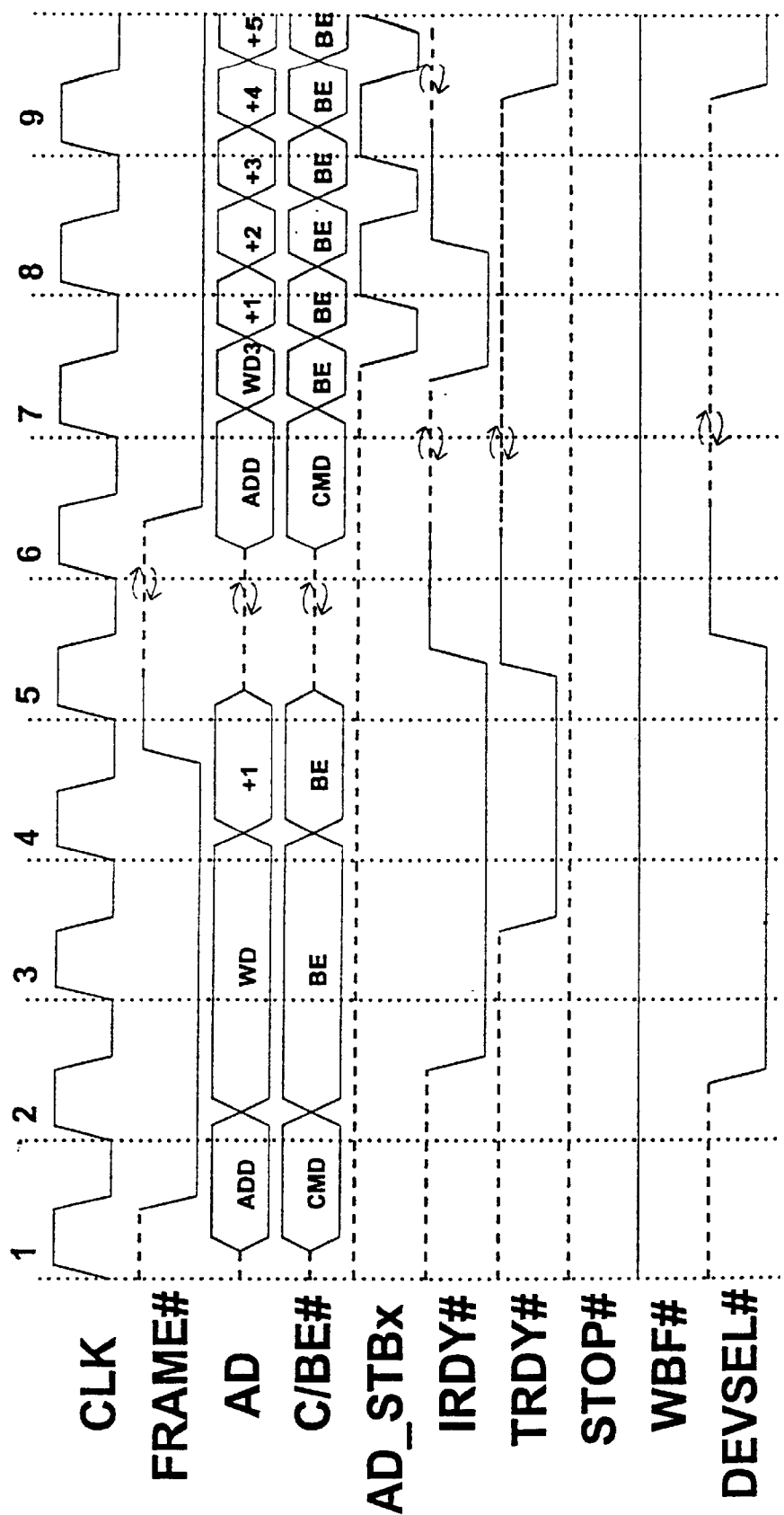
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
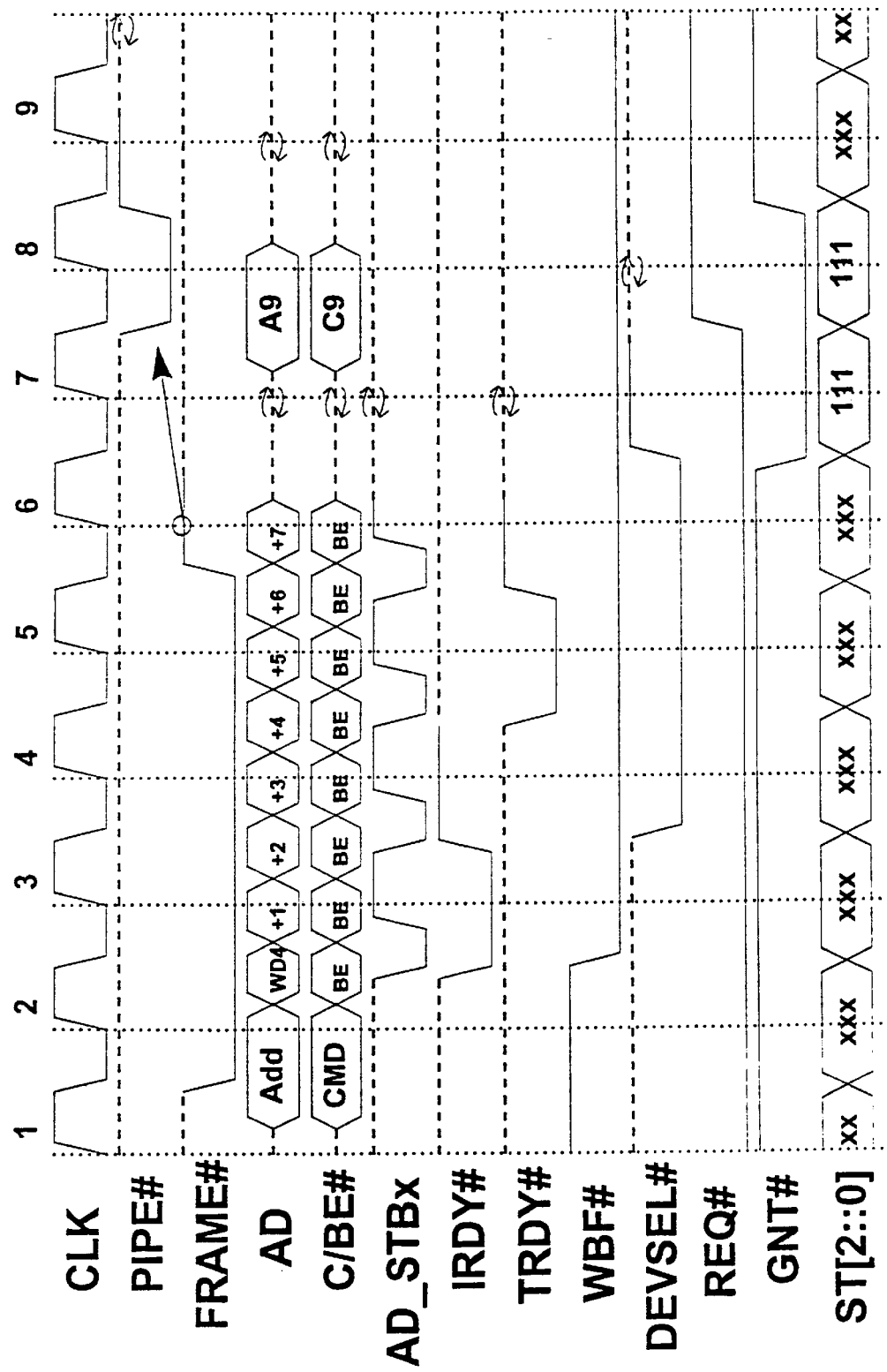
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
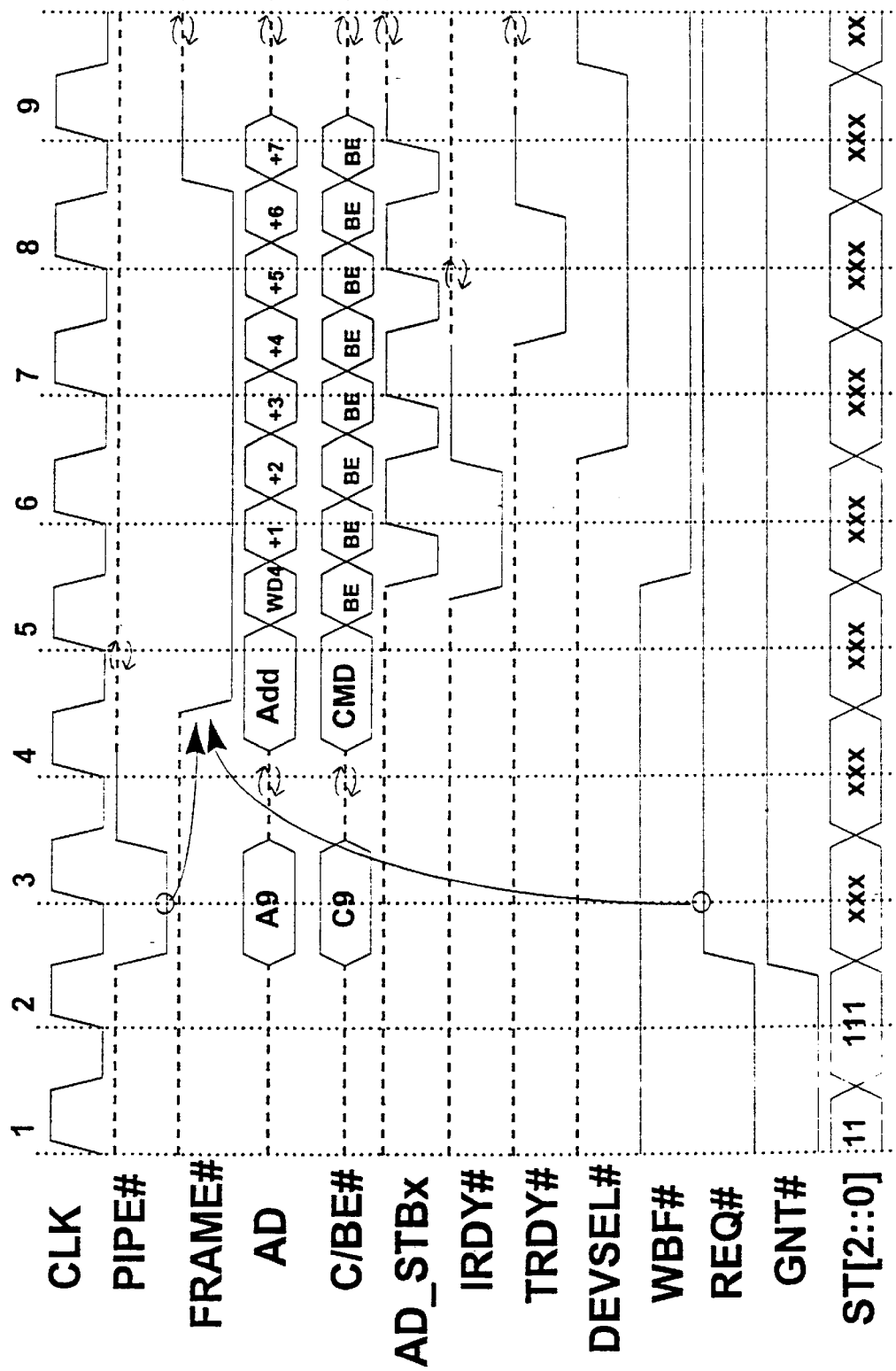
Figures 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
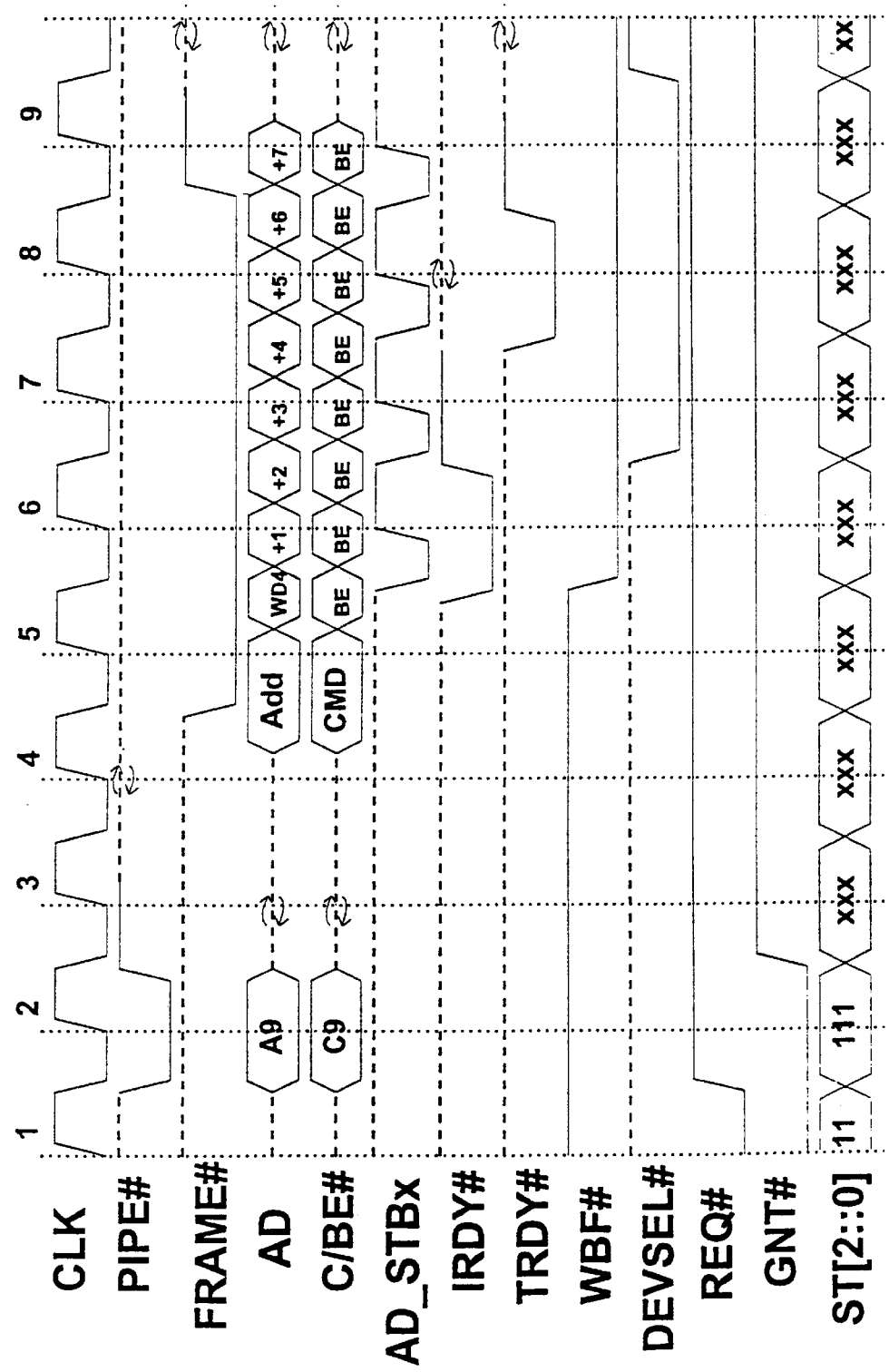

FIG. 4-6 is a transaction where the target is only willing to accept two blocks of data. In this case, the assertion of TRDY# on clock 5 indicates that the target is willing to accept the second block of data. But since STOP# is also asserted on clock 5, the target is indicating that it is not willing to accept a third block of data. In this case, the master may have intended to complete the transaction on clock 7 anyway, or is required to stop it prematurely because STOP# was asserted on clock 5. Regardless of the master's intent, the transaction ends on clock 7 which is indicated by FRAME# being deasserted on clock 7. The target is required to accept up to four clocks of data per block when it asserts TRDY# indicating it is willing to accept the next block. In this case, if the core logic desired to continue, it could have transferred data on clocks 9 and 10 before it is required to stop the transaction because STOP# was asserted on clock 5. The target is required to keep STOP# asserted until it samples FRAME# deasserted, at which time it is required to deassert and tri-state STOP#.

FIG. 4-7 is the same as FIG. 4-6 except the target inserts a waitstate between blocks. In this case, the assertion of STOP# is required to be delayed one clock. Asserting STOP# on clock 5 with TRDY# deasserted, indicates that the target is not willing to transfer the second block of data. As shown in this figure, the target is willing to accept the second block after a waitstate, but is not willing to accept the third block of data. Again, the master may have intended to stop during the second block anyway because FRAME# is deasserted before clock 11. (IRDY# is asserted when FRAME# is deasserted because the core logic is transferring one Qword in the subsequent block. If it had been two, three, or four Qwords, FRAME# would be deasserted when IRDY# was also deasserted.)

The PCI target termination known as "disconnect without data" is supported for FW transactions. It is not the most advantageous implementation of the two disconnect options, since it requires clocks without data transfer. Disconnect without data is signaled on the bus when the target claims the access by asserting DEVSEL# and then asserts STOP# but keeps TRDY# deasserted at the TP which occurs on clock 5. The TP completes when either TRDY# or STOP# is asserted. STOP# is used to request the master to stop the transaction and TRDY# is used to indicate that the target is not willing to transfer the next block of data.

FIG. 4-8 is a case when the target accepts the first four clocks worth of data since WBF# is deasserted, but is not willing to accept the second block of data because STOP# is asserted on clock 5. In this case, the core logic is required to deassert FRAME# on clock 6 to indicate the last data phase. The arbiter should not assert GNT# for a different transaction until all shared signals have been deasserted and tri-stated in preparation for the next transaction. In the case of FW transactions, the bus will appear to be in the Idle condition one clock before it actually reaches that state. Therefore, the arbiter needs to track what type of access is currently ongoing and then delay the assertion of GNT# for a new transaction until it ensures that no contention occurs on the shared signals.

FIG. 4-9 is the same as FIG. 4-8 except that the target inserts one waitstate before it indicates that it is incapable of continuing the burst. In this case, a waitstate is inserted on clock 7 because TRDY# was deasserted on clock 5, and the core logic deasserts FRAME# on clock 7 because STOP# was asserted on clock 6. The TP for this transaction completes on clock 6 because STOP# is asserted. Once STOP# is asserted, it must remain asserted until FRAME# is sampled deasserted which occurs on clock 7. The master has indicated to the target that some data in the next block will be transferred because FRAME# is asserted on clock 6. If the master inserted a waitstate between clocks, it is allowed to delay deassertion of FRAME# even though STOP# is asserted on clock 6. The master must complete the current transaction as soon as possible.

The PCI target termination known as "target-abort" is supported for FW transactions. It has the same meaning as in the PCI Specification. The target can never complete the current request and the master is required to not repeat it again. This is an error condition and is signaled on the interface by deasserting DEVSEL# (after it was asserted) with TRDY# deasserted and STOP# asserted.

The target of the FW transaction claims the access by asserting DEVSEL# on clock 3, in FIG. 4-10, when it has completed the address and command decodes. The target is required to accept the first block of data before it can request the transaction to stop. In this case, the target has determined that it cannot complete the transaction and requests the master to stop when the transfer of the first block completes. The target deasserts DEVSEL#, keeps TRDY# deasserted and asserts STOP# on clock 5 to signal a target-abort. Since STOP# is asserted on clock 5, the master is required to deassert FRAME#. The target is required to keep STOP# asserted until it samples FRAME# deasserted, which occurs on clock 6 in the example. Once FRAME# is deasserted, the target then deasserts and tri-states STOP#. The target could have delayed the signaling of target-abort by keeping DEVSEL# asserted and STOP# and TRDY# deasserted.

The PCI termination known as "master-abort" is supported for FW transactions. It has the same meaning as in the PCI Specification but can occur when data transfers for the transaction. Since the target is required to accept the first four clocks worth of data (WBF# deasserted), a true PCI master-abort cannot be signaled. However, the same signaling is used. The difference is that four clocks of data are transferred before the master knows that there is no target accepting the data. FW master-abort termination is signaled on the interface the same way it is in the PCI Specification in that DEVSEL# is not asserted by slow decode time. FW transactions do support the termination of a transaction when the target fails to assert DEVSEL# when the transaction requires multiple blocks to transfer. The master knows that waitstates are not being inserted by the target between the initial and subsequent blocks, when both TRDY# and DEVSEL# are both deasserted by the slow decode sample point.

In FIG. 4-11 the target fails to assert DEVSEL# at clock 5. In this case the master knows that no target is going to respond. The data transferred during the first block is dropped. Subsequent blocks are treated as a separate transaction, since separate memory write operations can be combined into a single bus transaction. The target asserts DEVSEL# by clock 5 in order to perform target termination or to insert waitstates.

A PCI normal termination occurs when the master was able to transfer all the desired data. This means that the target did not assert STOP# to request the master to end the transaction. This is the typical termination of a FW transaction. A normal completion is shown in FIG. 4-1 and FIG. 4-3.

FIG. 4-12 is an example of back-to-back transactions where a dead clock is placed between the transactions. Most of the shared signals have a turn-around time on clock 7. Thus, the second transaction is not required to originate from the same master as the previous transaction. However, in this figure, they are both from the core logic. This condition may be required when the core logic uses the maximum time to assert AD_STBx. The timing could be such that it is impossible to do back-to-back transactions without a dead clock between transactions.

FIG. 4-13 is the same as FIG. 4-12 except that the dead clock has been removed from between the transactions. As mentioned earlier, this type of transaction may not be possible if the maximum delay is used by the core logic in driving the strobes and data lines. Since it is possible for the core logic to do this access, the target (the AGP master acting as PCI target) is required to handle it when issued. Since ownership of the shared signals does not change, a turn-around cycle is not required. The AGP master, when functioning as the PCI target for FW protocol, must be able to handle fast back-to-back transactions like the PCI requirement for targets. In this case, this type of transaction can only be initiated when both accesses are from the same master.

FIG. 4-14 shows an FW transaction completing normally. However, WBF# is asserted by the AGP master on clock 6 which prevents the core logic from initiating a new transaction on clock 7 or thereafter. In this case, the core logic was not doing a fast back-to-back transaction and would have asserted FRAME# on clock 8 if WBF# had been deasserted on clock 7. Thus, the target indicates, by asserting WBF#, that the target's write buffers are full and the target cannot accept a new memory write transaction. If the core logic has more buffered write data that needs to be delivered to the target, it must not initiate the FW transaction until WBF# is deasserted. When FW protocol is enabled, the core logic is not allowed to initiate a PCI memory write transaction using standard PCI protocol.

FIG. 4-15 is the same as FIG. 4-14 except that two transactions are done as fast back-to-back (no turn-around between accesses). In this case, WBF# is asserted one clock earlier to ensure that the second transaction may not be initiated. If WBF# had been delayed one clock, the second transaction would have been allowed which is illustrated in FIG. 4-19. With the proper use of WBF#, the target is only required to have five clocks of buffering which is shown in FIG. 4-19. The target accepts the first four clocks of any transaction before it inserts waitstates or does a target termination (disconnect or target-abort). A target termination of retry is not allowed since this termination means that no data was transferred for the current transaction. This would mean that the master initiated the transaction even though WBF# was asserted or the target did not accept the four clocks worth of data.

In FIG. 4-16, the entire transaction can be completed in two clocks. The first clock is for the address and command, while the second clock is for the actual data transfer. Since WBF# is deasserted, the core logic knows that the entire transaction can complete without a TP. In this case, the target may not have completed the address decode before the data has completely transferred. The assertion of DEVSEL# in this condition is optional. The target is only required to assert DEVSEL# before or with the assertion of TRDY# or STOP#. Since this transaction does not reach a TP, the assertion of DEVSEL# is optional. The target must accept the first four clocks of any transaction independent of completing the address decode. Once the decode completes and the device is not the target of the transaction, it discards the data that was latched. This is a requirement if there is more than one target interface active when the core logic is the master. This can occur when the AGP master contains more than a single function; in other words, when the AGP master is a multifunction device that presents multiple PCI configuration spaces to the system. In this case, the core logic believes there is a single device and assumes that it is targeting a single device and is allowed to do fast back-to-back accesses. If the first access was to function 0 and the second to function 1, both devices must latch the transaction and store the write data until a full address decode can be completed. When this has occurred, the device not selected by the address simply discards the latched data and does not assert DEVSEL# (claiming ownership of the current transaction.)

FIG. 4-17 is a back-to-back transaction where the initial transaction is short. In this case, a turn-around cycle is placed between the transactions. The extra clock is not required in all cases. DEVSEL# was not asserted for the first transaction since it completes before reaching a TP.

FIG. 4-18 is the same as FIG. 4-14 except that in this case the first transaction is short. WBF# must be asserted as soon as the transaction starts in order to prevent a subsequent transaction from being initiated.

FIG. 4-19 is the case where the target cannot prevent two transactions from completing. In this case, the first transaction is so short that the core logic cannot detect WBF# asserted until clock 3 which is the same clock in which the second transaction is initiated using a fast back-to-back transaction. For this type of sequence, the AGP master, acting as a PCI target doing FW protocol, is required to provide enough buffering to accept five clocks worth of data. In this case it requires two Dwords for the first transaction and an additional eight Dwords for the subsequent transaction. The target is only allowed to insert waitstates or terminate the transaction at block boundaries which occur every four clocks. If the master had inserted a waitstate on the initial transaction (delayed the assertion of IRDY#) or the transaction was longer than two clocks, WBF# could be detected before the second transaction was initiated. Since this transaction is possible, the target must provide sufficient buffering for it to occur.

When a FW is followed by a core logic PCI read transaction, no turn-around cycle is needed for the AD or C/BE# buses since the core logic is the master for both transactions. FIG. 4-20 illustrates that there is no contention on any of the shared signals. Therefore, a turn-around cycle between the transactions is not required. However, the core logic is allowed to insert multiple dead clocks. PCI transactions occur on the interface at 1× transfer rates and use an IRDY#—TRDY# handshake to transfer data.

FIG. 4-21 shows that a turn-around cycle is needed on the AD bus since the graphics agent was driving it at the end of the PCI read transaction and the core logic will drive it for the transaction. All other signals have sufficient time for a turn-around to prevent contention.

FIG. 4-22 is the same as FIG. 4-25 except the transaction order is reversed. A turn-around is required on clock 7 for TRDY# since it changes ownership.

When an AGP read transaction follows a FW transaction that has 3 clocks of data, 2 turn-around cycles are required. In FIG. 4-23, the graphics agent does not know the length of the transfer and asserts TRDY# on clock 5 to indicate that it is willing to continue the burst without waitstates. However, the core logic transfers the entire transaction during the initial block and does not require a subsequent block. Since TRDY# was asserted, the graphics agent must deassert it and then tri-state it. The core logic cannot control TRDY# until clock 7. Therefore, the AD bus has two dead clocks before the core logic can initiate the second transaction. This same condition can occur whenever FRAME# is deasserted and TRDY# is asserted. For example, in FIG. 4-22, if the graphics agent had inserted a waitstate on clock 5, TRDY# would have been asserted on clock 6 when FRAME# was deasserted.

When the FW transaction completes with less than 3 clocks of data, only a single turn-around is required. In FIG. 4-24 the graphics agent does not assert TRDY# on clock 5 because FRAME# is deasserted on clock 4. The core logic indicates that the current clock is the final data phase when FRAME# is deasserted.

FIG. 4-25 is an AGP read data transaction followed by an FW. The core logic is driving the AD bus for both transactions. However, IRDY# is required to have a turn-around cycle since ownership changes. In this case, the second transaction is the FW and has an address phase which gives IRDY# time to switch. A turn around cycle is required when bus protocols change. Therefore, a turn around cycle occurs on clock 4 because of protocol requirements (not to avoid contention).

FIG. 4-26 shows the same two transactions as FIG. 4-28, except they are in reverse order. In this case, multiple signals need turn-around cycles to remove contention. This is different than the previous figure because there is no address phase on the second transaction. In the previous case, the other signals had a chance to turn around before they were driven by the second agent. The arbiter is allowed to assert GNT# for a write transaction, when FRAME# (or PIPE#) is asserted on the previous transaction. Therefore, the arbiter could assert the GNT# in this figure on clocks 3, 4, 5, 6, or 7.

FIG. 4-27 is the same as FIG. 4-29 except that in this figure the FW transfers one clock of data in the second block. When this occurs, the core logic asserts IRDY# on clock 5 indicating that the second block of data is starting to transfer and since FRAME# is deasserted it is the last clock in which data will transfer. Because ownership of IRDY# occurs between these transactions, the arbiter is required to ensure that two clocks of turn-around occur before the next transaction can start.

FIG. 4-28 is an AGP write transaction followed by an FW transaction. In this case, the turn-around is required because the AD bus is owned by different agents. Notice that no other signal has any requirement for a turn-around. In this case, the write data is being provided by the AGP master while the FW data is provided by the core logic. If the AGP write transaction had been short, IRDY# may also have required a turn-around cycle.

FIG. 4-29 is a FW transaction followed by a graphics PCI master read transaction. A turn-around is needed since ownership of the AD and C/BE# buses changes.

In FIG. 4-30 the AD bus is owned by the same agent and therefore does not need a turn-around. However, the C/BE# bus changes ownership from the graphics agent, as master, to the core logic, as master, for the FW transaction. With this turn-around cycle, IRDY# and TRDY# have sufficient time to avoid contention.

When different agents are bus masters for a back to back transaction, a turn-around cycle is needed and occurs on clock 7 in FIG. 4-31. FIG. 4-31 shows an FW transaction followed by a graphics PCI master write.

Ownership of the AD, C/BE# and FRAME# changes, and therefore they need a turn-around cycle between bus transactions which occurs on clock 6 in FIG. 4-32.

FIG. 4-33 is an FW followed by an AGP request using the AD bus. In this case, a turn-around cycle is required on the AD bus since different agents are driving it. The core logic was driving the AD bus for the FW transaction and the AGP master drives it for the AGP request. The arbiter asserts the GNT# for the AGP master when it samples FRAME# deasserted on the FW transaction. In this figure, the AGP master starts as quickly as it can. The AGP master is allowed to delay the assertion of PIPE# one clock.

FIG. 4-34 is an FW transaction following an AGP request (single request). In this case, the AD and C/BE# buses must be turned around before the FW transaction can be initiated. This can be accomplished with a single turn-around access since the arbiter knows that the transaction will be a single clock because REQ# is deasserted on the clock in which PIPE# is asserted. This indicates that a single request is being enqueued. Since the core logic is the arbiter and the master of an FW transaction, the core logic does not need an external GNT# and, therefore, the core logic knows in advance that it can start on the clock after PIPE# is deasserted.

FIG. 4-35 is the same as FIG. 4-34 except that the core logic takes an extra clock to start the FW transaction. In this case, the arbiter was slow in giving the internal GNT# or the FW interface took an extra clock to get started.

Thus, a high-throughput interconnect which has both pipelined and non-pipelined bus transaction modes has been described. Although the present invention has been described with reference to specific exemplary embodiments, various modifications and variations may be made to these embodiments without departing from the spirit and scope of the invention as set forth in the claims.

What is claimed is:

1. A method for transferring data between an interface, a system memory controller and a graphics accelerator comprising:
   allowing an initial and a subsequent transaction;
   controlling whether or not said subsequent transaction occurs by indicating whether or not a write buffer for the graphics accelerator is able to accept sufficient information after the initial block has transferred; and
   writing data from said interface directly to said graphics accelerator if said graphics accelerator is able to accept said transaction.

2. The method of claim 1 including selectively allowing data to be written directly to said graphics accelerator as opposed to writing said data to system memory and having the graphics accelerator read said data in system memory.

3. The method of claim 1 including providing an indication of whether the graphics accelerator is able to accept a given amount of data and based on said indication, determining whether to write directly to said graphics accelerator or to write to system memory.

4. The method of claim 3 including allowing an initial and a subsequent transaction and controlling whether or not a subsequent transaction occurs by indicating whether or not a write buffer in the peripheral device is able to accept sufficient information after the initial block has transferred.

5. The method of claim 1 including enqueuing said transaction in said interface if the graphics accelerator is unable to accept the data.

\* \* \* \* \*